US012628039B2

(12) United States Patent
Kim

(10) Patent No.: US 12,628,039 B2
(45) Date of Patent: May 12, 2026

(54) METHOD AND DEVICE FOR PREVENTING DECOMPRESSION ERROR IN NEXT-GENERATION MOBILE COMMUNICATION SYSTEM

(71) Applicant: Samsung Electronics Co., Ltd., Gyeonggi-do (KR)

(72) Inventor: Donggun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 596 days.

(21) Appl. No.: 18/081,121

(22) Filed: Dec. 14, 2022

(65) Prior Publication Data

US 2023/0189066 A1     Jun. 15, 2023

(30) Foreign Application Priority Data

Dec. 15, 2021     (KR) ........................ 10-2021-0179566

(51) Int. Cl.
*H04W 28/06*     (2009.01)
*H04W 76/19*     (2018.01)

(52) U.S. Cl.
CPC ........... *H04W 28/06* (2013.01); *H04W 76/19* (2018.02)

(58) Field of Classification Search
CPC ..... H04W 28/06; H04W 76/19; H04W 76/20; H04W 80/02; H04W 28/04; H04L 1/1851; H04L 1/1864; H04L 69/04
See application file for complete search history.

(56) References Cited

U.S. PATENT DOCUMENTS

2019/0090156 A1     3/2019  Kim et al.
2019/0141571 A1*    5/2019  Kim ................. H04W 28/0278
2021/0377794 A1*   12/2021  Kanamarlapudi .... H04L 1/1812
2022/0038951 A1*    2/2022  Jo ......................... H04W 28/06
(Continued)

FOREIGN PATENT DOCUMENTS

CN          111133791         5/2020
EP          3 665 973         8/2021
(Continued)

OTHER PUBLICATIONS

3GPP TS 36.323 V16.4.0, 3GPP, 3rd Generation Partnership Project; Technical Specification Group Radio Access Network; Evolved Universal Terrestrial Radio Access (E-UTRA); Packet Data Convergence Protocol (PDCP) Specification (Release 16), Sep. 2021, 57 pages.
(Continued)

*Primary Examiner* — Ayaz R Sheikh
*Assistant Examiner* — David Zhijun Sun
(74) *Attorney, Agent, or Firm* — The Farrell Law Firm, P.C.

(57) ABSTRACT

The disclosure relates to a communication technique for converging Internet of things technology with 5G communication systems designed to support a higher data transfer rate beyond 4G systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology. The disclosure provides a method and a device for preventing a data decompression error in a next-generation mobile communication system.

16 Claims, 16 Drawing Sheets

(56) References Cited

U.S. PATENT DOCUMENTS

| | | | | |
|---|---|---|---|---|
| 2024/0314220 A1* | 9/2024 | Fu | ........................... | H04L 69/22 |
| 2025/0039737 A1* | 1/2025 | He | ....................... | H04W 76/19 |

FOREIGN PATENT DOCUMENTS

| | | |
|---|---|---|
| EP | 4 009 603 | 6/2022 |
| KR | 1020210054998 | 5/2021 |

OTHER PUBLICATIONS

Catt et al., "Discussion on Introduction of NR UDC", R2-2111067, 3GPP TSG-RAN2 #116-e, Nov. 1-12, 2021, 7 pages.
3GPP TS 36.306 V16.6.0, 3GPP, 3rd Generation Partnership Project; Technical Specification Group Radio Access Network; Evolved Universal Terrestrial Radio Access (E-UTRA); User Equipment (UE) Radio Access Capabilities (Release 16), Sep. 2021, 147 pages.
3GPP TS 38.323 V16.5.0, 3GPP, 3rd Generation Partnership Project; Technical Specification Group Radio Access Network; NR; Packet Data Convergence Protocol (PDCP) Specification (Release 16), Sep. 2021, 41 pages.
International Search Report dated Mar. 23, 2023 issued in counterpart application No. PCT/KR2022/020399, 7 pages.
3GPP TS 36.323 V16.2.0, (Sep. 2020), p. 56.
European Search Report dated Oct. 22, 2024 issued in counterpart application No. 22907947.0-1215, 13 pages.

* cited by examiner

METHOD AND DEVICE FOR PREVENTING DECOMPRESSION ERROR IN NEXT-GENERATION MOBILE COMMUNICATION SYSTEM

CROSS-REFERENCE TO RELATED APPLICATION(S)

This application is based on and claims priority under 35 U.S.C. § 119 to Korean Patent Application No. 10-2021-0179566, which was filed in the Korean Intellectual Property Office on Dec. 15, 2021, the entire disclosure of which is incorporated herein by reference.

BACKGROUND

1) Field

The disclosure relates generally to a method and a device for preventing a data decompression error in a next-generation mobile communication system.

2) Description of Related Art

To meet the increasing demand for wireless data traffic since the deployment of fourth generation (4G) communication systems, efforts have been made to develop an improved fifth generation (5G) or pre-5G communication system. Therefore, the 5G or pre-5G communication system is also called a beyond 4G network communication system or a post LTE" system. The 5G communication system is considered to be implemented in ultrahigh frequency (mm-Wave) bands (e.g., 60 GHz bands) to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet is also evolving to the Internet of things) where distributed entities, i.e., things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), etc., have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

In a next-generation mobile communication system, a downlink may secure more transmission resources using a high frequency band and a wide bandwidth. In a base station, more physical antennas may be installed and used, and thus a beamforming gain and a high signal strength may be obtained, so that more data may be loaded onto the same frequency/time resource so as to be transmitted to a terminal via the downlink. However, in a case of an uplink, a terminal has a physically small size, making it difficult to use a high frequency band and a wide bandwidth for an uplink frequency. Thus, a bottleneck may more likely occur in an uplink transmission resource than in a downlink transmission resource. The maximum transmission power of a terminal is much smaller than that of a base station, and therefore there is a problem that coverage becomes smaller during uplink data transmission. Accordingly, it is required to efficiently use transmission resources by compressing uplink data.

A method of compressing uplink data or compressing user data (e.g., uplink data compression (UDC)) provides a scheme of successively compressing data, based on previous data. Therefore, if one piece of data in a series of compressed data is lost or discarded, or decompression of the data fails, data decompression fails for all data subsequent to the lost, discarded, or decompression-failed data.

A transmission end packet data convergence protocol (PDCP) layer device may drive a PDCP discard timer for each piece of data every time data is received from a higher layer device. If a UDC procedure has been configured, the transmission end PDCP layer device may apply the uplink compression procedure to data for which the uplink compression procedure is to be performed based on a transmission UDC buffer context, may calculate a checksum field based on the transmission UDC buffer context to obtain a checksum field value, may configure an indicator indicating whether UDC is applied and configure the indicator for a UDC header, and may update the transmission UDC buffer context based on raw data before compression is applied to the data for which the compression procedure has been applied. The transmission end PDCP layer device may generate a PDCP packet data unit (PDU) by ciphering the data for which the UDC has been performed, assigning a PDCP sequence number thereto, and configuring a PDCP header, so as to transmit the generated PDCP PDU.

A reception end PDCP layer device may rearrange received data according to a PDCP sequence number or a count value. Alternatively, when a radio link control (RLC) layer device arranges a sequence of the received data according to an RLC sequence number and delivers the same to the reception end PDCP layer device, the reception end PDCP layer device may identify whether UDC has been applied to each piece of data (e.g., PDCP PDU or PDCP service data unit (SDU)), by using an identifier of the UDC header, and may identify whether context of a transmission UDC buffer and context of a current reception UDC buffer are synchronized or identical, based on the checksum field value of the UDC header.

If it is identified that the context of the transmission UDC buffer and the context of the reception UDC buffer are not synchronized or are different when the checksum field value is calculated, a checksum failure or a decompression error occurs, and the reception end PDCP layer device may transmit PDCP control data to a transmission end to indicate that the checksum failure or the decompression error has occurred. When the PDCP control data (feedback for the checksum failure) is received, the transmission end PDCP layer device may initialize the transmission end UDC buffer, and may newly apply UDC compression to new data or data which has not been transmitted but to which UDC compression has already been applied. However, if the reception end PDCP layer device receives data which has already been compressed and generated by the transmission end PDCP layer device before the PDCP control data is received, or data which has already been delivered to a lower layer device, another checksum failure or error may occur, or data that does not include an indicator indicating that the transmission UDC buffer has been initialized may be discarded. Therefore, due to unnecessary data transmission described above, transmission resources may be wasted.

Therefore, needed is an efficient transmission end PDCP layer device or reception end PDCP layer device that operates to prevent unnecessary data transmission with respect to a checksum failure which may occur during the user data compression or decompression procedure.

SUMMARY

The disclosure has been made to address at least the above-mentioned problems and/or disadvantages and to provide at least the advantages described below.

An aspect of the disclosure is to provide a method performed by a terminal in a wireless communication system. The method includes receiving, from a base station, PDCP configuration information; in case that a UDC configuration is included in the PDCP configuration information, generating uplink data based on the UDC configuration; and transmitting, to the base station, the uplink data. In case that a PDCP entity of the terminal is a new radio (NR) PDCP, the UDC configuration is included in the PDCP configuration information based on an RLC entity of a radio bearer associated with the NR PDCP set to an acknowledged mode (AM).

Another aspect of the disclosure is to provide a method performed by a base station in a wireless communication system. The method includes transmitting, to a terminal, PDCP configuration information including a UDC configuration; and receiving, from the terminal, uplink data based on the UDC configuration. In case that a PDCP entity of the terminal is an NR PDCP, the UDC configuration is included in the PDCP configuration information based on an RLC entity of a radio bearer associated with the NR PDCP set to an AM.

Another aspect of the disclosure is to provide a terminal for use in a wireless communication system. The terminal includes a transceiver and a controller configured to control the transceiver to receive, from a base station, PDCP configuration information; in case that a UDC configuration is included in the PDCP configuration information, generate uplink data based on the UDC configuration; and control the transceiver to transmit, to the base station, the uplink data. In case that a PDCP entity of the terminal is an NR PDCP, the UDC configuration is included in the PDCP configuration information based on an RLC entity of a radio bearer associated with the NR PDCP set to an AM.

Another aspect of the disclosure is to provide a base station for use in a wireless communication system. The base station includes a transceiver and a controller that is configured to control the transceiver to transmit, to a terminal, PDCP configuration information including a UDC configuration; and receive, from the terminal, uplink data based on the UDC configuration. In case that a PDCP entity of the terminal is an NR PDCP, the UDC configuration is included in the PDCP configuration information based on an RLC entity of a radio bearer associated with the NR PDCP set to an AM.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a next-generation mobile communication system to which the disclosure may be applied;

FIG. 7 illustrates a UDC method according to an embodiment;

FIG. 8 illustrates a problem that a decompression failure of a UDC method occurs;

FIG. 12 illustrates an Ethernet header compression method (EthHC) when an SDAP header or a layer device is configured according to an embodiment;

FIG. 16 illustrates a transmission reception point (TRP) in a wireless communication system according to an embodiment.

DETAILED DESCRIPTION

Hereinafter, operation principles are described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents in the disclosure.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. Herein, the term eNB may be interchangeably used with the term gNB for the convenience of description. That is, a base station described as eNB or ENB may indicate gNB.

Figure 1:
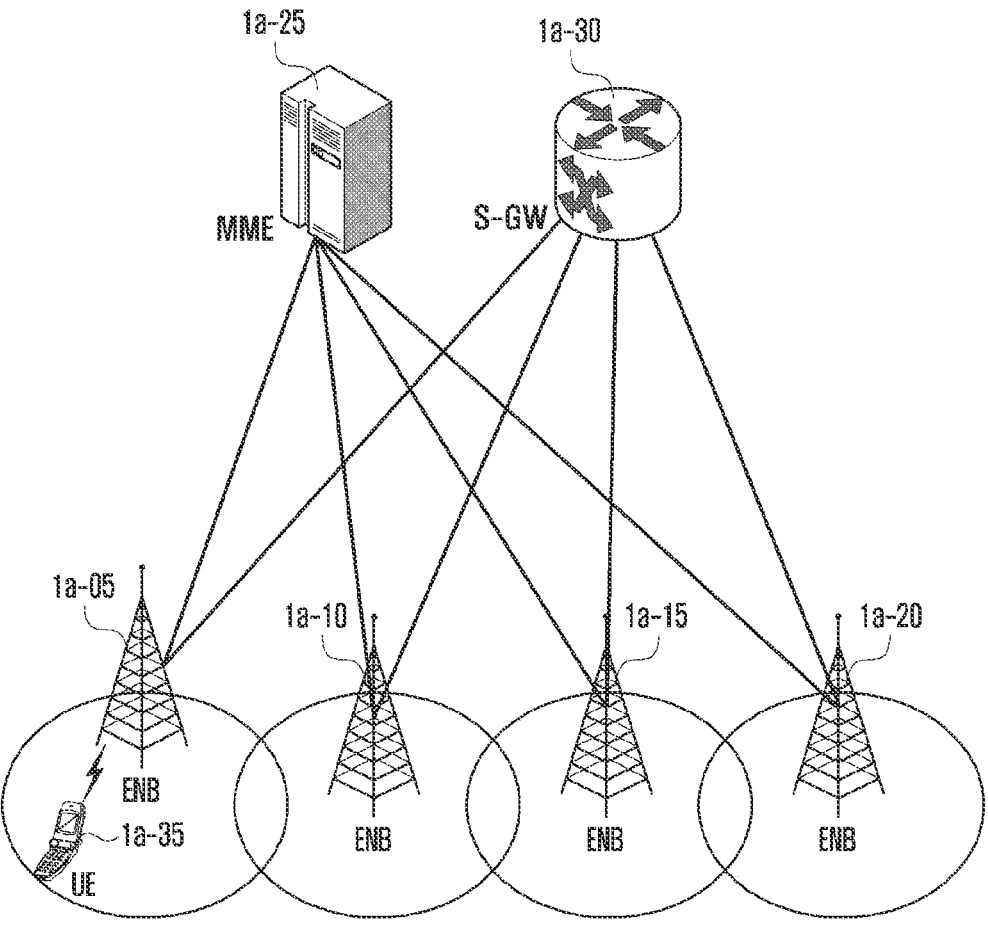
FIG. 1 illustrates an LTE system to which the disclosure may be applied.

FIG. 1 illustrates an LTE system to which the disclosure may be applied.

Referring to FIG. 1, a RAN of an LTE system includes next-generation base stations (e.g., an evolved Node B (ENB), a Node B, or a base station) 1a-05, 1a-10, 1a-15, and 1a-20, a mobility management entity (MME) 1a-25, and a serving-gateway (S-GW) 1a-30. A user terminal (e.g., a user equipment (UE) or a terminal) 1a-35 accesses an external network via the ENBs 1a-05 to 1a-20 and the S-GW 1a-30.

In FIG. 1, the ENBs 1a-05 to 1a-20 correspond to existing Node Bs of a universal mobile telephone system. The ENBs are connected to the UE 1a-35 via a radio channel and perform more complex roles compared to the existing Node Bs. In the LTE system, all user traffic including a real-time service, such as voice over Internet protocol (VoIP), is serviced through a shared channel so that a device which collects state information, such as buffer states, available transmission power states, and channel states of the UEs, so as to perform scheduling is required, and the ENBs 1a-05 to 1a-20 take on the role of the device. A single ENB typically controls multiple cells. For example, in order to implement a transmission rate of 100 Mbps, the LTE system uses, e.g., orthogonal frequency division multiplexing (OFDM) as a radio access technology in a 20 MHz bandwidth. Further, an adaptive modulation and coding (AMC) scheme that determines a modulation scheme and a channel coding rate according to a channel state of a terminal is applied. The S-GW 1a-30 is a device configured to provide a data bearer, and generates or removes a data bearer under control of the MME 1a-25. The MME is a device that is in charge of various control functions as well as a mobility management function for a terminal, and is connected to multiple base stations.

Figure 2:
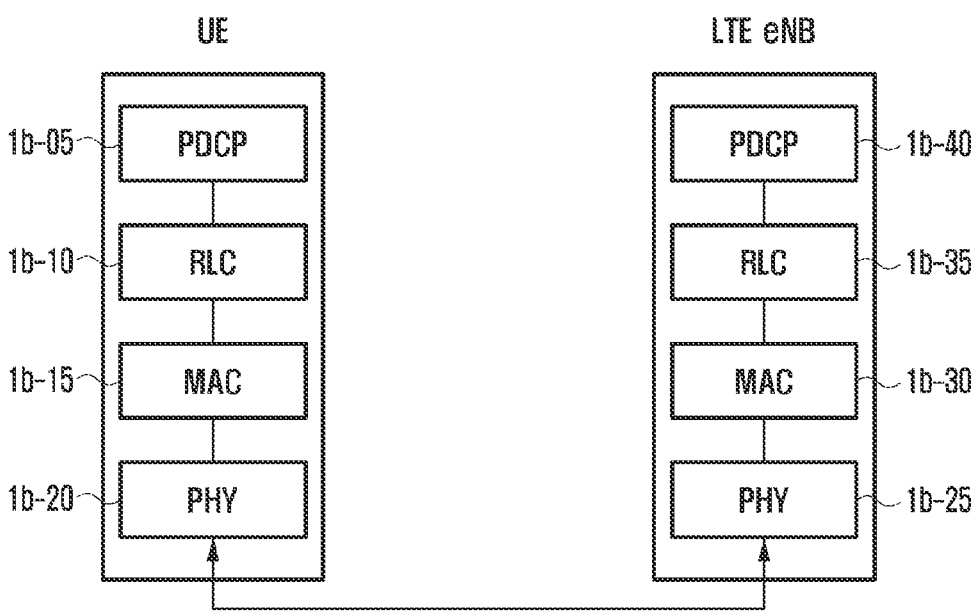
FIG. 2 illustrates a radio protocol structure in the LTE system to which the disclosure may be applied.

FIG. 2 illustrates a radio protocol structure in the LTE system to which the disclosure may be applied.

Referring to FIG. 2, the radio protocol of the LTE system includes PDCPs 1b-05 and 1b-40, RLCs 1b-10 and 1b-35, and medium access controls (MACs) 1b-15 and 1b-30 in a terminal and an eNB, respectively. The PDCPs 1b-05 and 1b-40 are in charge of operations, such as IP header compression/restoration. Main functions of the PDCPs are summarized as follows:

Header compression and decompression function (robust header compression (ROHC) only)

User data transmission function (transfer of user data)

Sequential delivery function (in-sequence delivery of upper layer PDUs at PDCP re-establishment procedure for RLC AM)

Reordering function (for split bearers in DC (only support for RLC AM): PDCP PDU routing for transmission and PDCP PDU reordering for reception)

Duplicate detection function (duplicate detection of lower layer SDUs at PDCP re-establishment procedure for RLC AM)

Retransmission function (retransmission of PDCP SDUs at handover and, for split bearers in DC, of PDCP PDUs at PDCP data-recovery procedure, for RLC AM)

Encryption and decryption function (ciphering and deciphering)

Timer-based SDU discard function (timer-based SDU discard in uplink)

The RLC 1b-10 and 1b-35 reconfigure PDUs (PDCP PDUs) to appropriate sizes and perform automatic repeat request (ARQ) operations. Main functions of the RLCs are summarized as follows:

Data transmission function (transfer of upper layer PDUs)

ARQ function (error correction through ARQ (only for AM data transfer))

Concatenation, segmentation, and reassembly function (concatenation, segmentation, and reassembly of RLC SDUs (only for UM and AM data transfer))

Re-segmentation function (re-segmentation of RLC data PDUs (only for AM data transfer))

Reordering function (reordering of RLC data PDUs (only for UM and AM data transfer)

Duplicate detection function (only for UM and AM data transfer)

Error detection function (protocol error detection (only for AM data transfer))

RLC SDU discard function (only for UM and AM data transfer)

RLC re-establishment function

The MACs 1b-15 and 1b-30 are connected to multiple RLC layer devices included in one terminal, multiplex RLC PDUs to MAC PDUs, and demultiplex the RLC PDUs from the MAC PDUs. Main functions of the MACs are summarized as follows:

Mapping function (mapping between logical channels and transport channels)

Multiplexing and demultiplexing function (multiplexing/demultiplexing of MAC SDUs belonging to one or different logical channels into/from transport blocks (TB) delivered to/from the physical layer on transport channels)

Scheduling information reporting function

Hybrid automatic repeat request (HARQ) function (error correction through HARQ)

Function of priority handling between logical channels (priority handling between logical channels of one UE)

Function of adjusting priority between terminals (priority handling between UEs by means of dynamic scheduling)

Multimedia broadcast service (MBMS) service identification function

Transmission format selection function (transport format selection)

Padding function

The physical layers 1b-20 and 1b-25 perform channel-coding and modulation of higher layer data, make the channel-coded and modulated higher layer data into OFDM symbols, and transmit the OFDM symbols via a radio channel, or the physical layers 1b-20 and 1b-25 perform demodulation and channel-decoding of the OFDM symbols received through the radio channel, and deliver the same to a higher layer.

Figure 3:
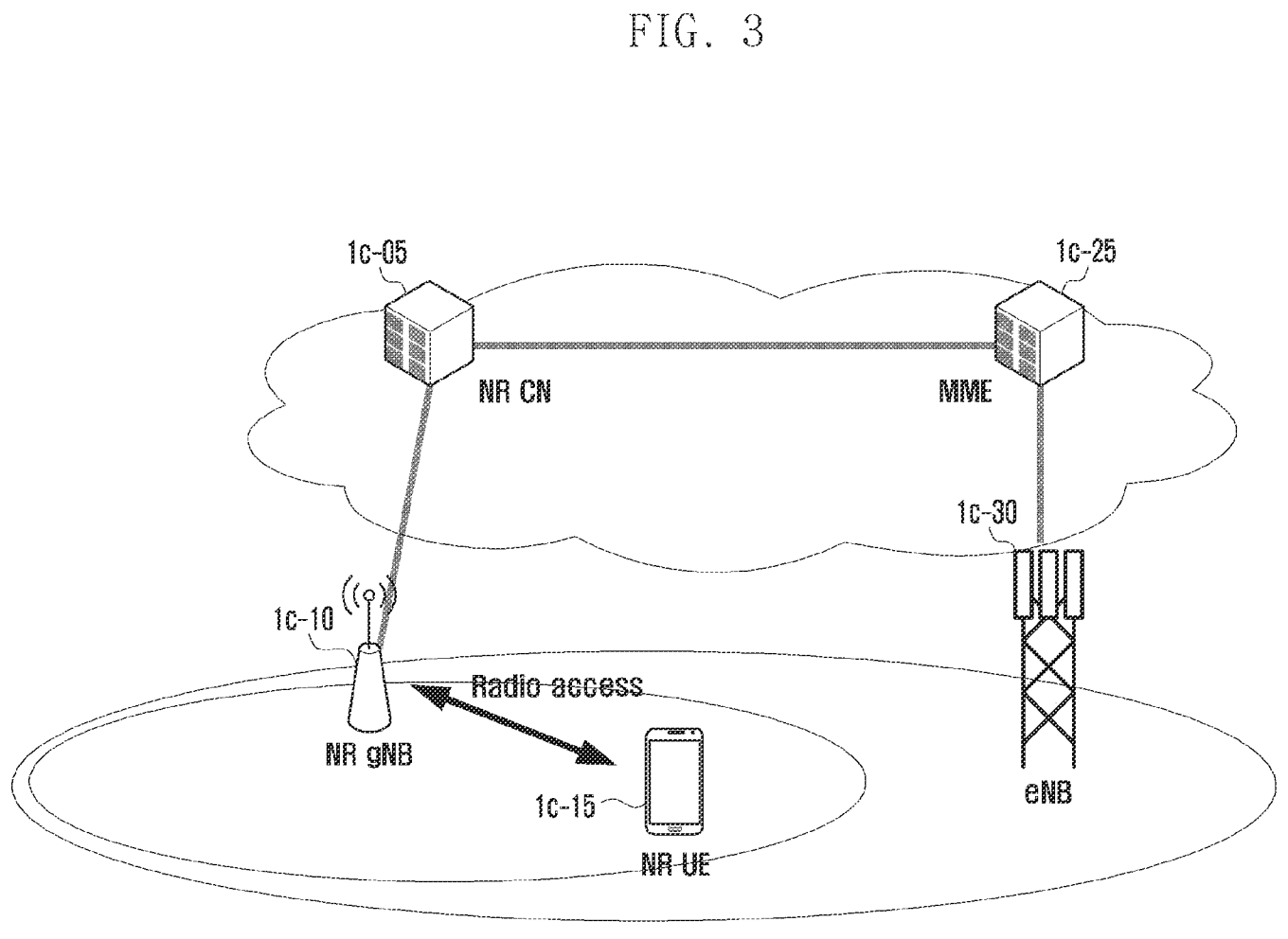

FIG. 3 illustrates a next-generation mobile communication system to which the disclosure may be applied.

Referring to FIG. 3, a RAN of the next-generation mobile communication system (e.g., NR or 5G) includes a next-generation base station (e.g., a NR Node B, a NR gNB, or a NR base station) 1c-10 and an NR core network (CN) 1c-05. A user terminal (e.g., an NR UE or a terminal) 1c-15 accesses an external network through the NR gNB 1c-10 and the NR CN 1c-05.

In FIG. 3, an NR gNB 1c-10 corresponds to an eNB of an existing LTE system. The NR gNB is connected to an NR UE 1c-15 via a radio channel, and may provide a more superior service compared to an existing node B. In the next-generation mobile communication system, because all user traffic is serviced via a shared channel, a device which collects state information, such as buffer states, available transmission power states, and channel states of UEs, so as to perform scheduling is required, and the NR NB 1c-10 takes on the role of the device. A single NR gNB typically controls multiple cells. To implement high-speed data transmission compared to the current LTE, an existing maximum bandwidth or more may be available, and beamforming technology may be additionally employed using OFDM as a radio access technology. Further, an AMC scheme that determines a modulation scheme and a channel coding rate according to a terminal channel state is applied. The NR CN 1c-05 performs functions, such as mobility support, bearer configuration, and quality of service (QoS) configuration. The NR CN is a device that performs various control functions as well as a mobility management function for a terminal, and is connected to multiple base stations. Further, the next-generation mobile communication system may be linked to an existing LTE system, and the NR CN is connected to the MME 1c-25 via a network interface. The MME is connected to the eNB 1c-30 that is an existing base station.

Figure 4:
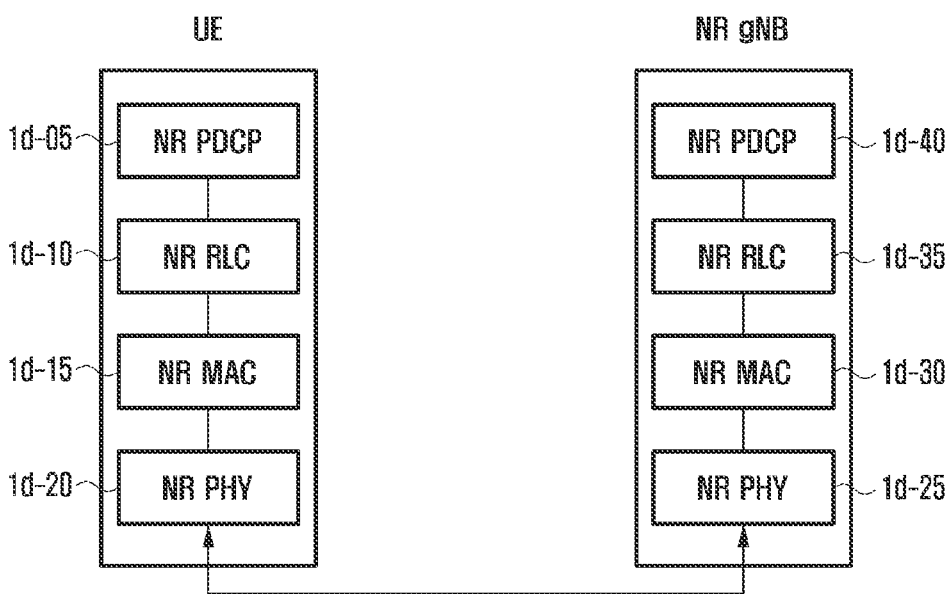
FIG. 4 illustrates a radio protocol structure of the next-generation mobile communication system to which the disclosure may be applied.

FIG. 4 illustrates a radio protocol structure of the next-generation mobile communication system to which the disclosure may be applied.

Referring to FIG. 4, the radio protocol of the next-generation mobile communication system includes NR PDCPs 1d-05 and 1d-40, NR RLCs 1d-10 and 1d-35, and NR MACs 1d-15 and 1d-30 in a terminal and an NR base station, respectively. Main functions of the NR PDCPs 1d-05 and 1d-40 may include some of the following functions:

Header compression and decompression function (header compression and decompression: ROHC only)

User data transmission function (transfer of user data)

Sequential delivery function (in-sequence delivery of upper layer PDUs)

Non-sequential delivery function (out-of-sequence delivery of upper layer PDUs)

Reordering function (PDCP PDU reordering for reception)

Duplicate detection function (duplicate detection of lower layer SDUs)

Retransmission function (retransmission of PDCP SDUs)

Encryption and decryption function (ciphering and deciphering)

Timer-based SDU discard function (timer-based SDU discard in uplink)

In the above, the reordering function of an NR PDCP entity refers to a function of rearranging the order (reordering) of PDCP PDUs received in a lower layer, in the order based on PDCP sequence numbers (SN), may include a function of delivering data to a higher layer in the rearranged order or may include a function of directly delivering data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR RLCs 1d-10 and 1d-35 may include some of the following functions:

Data transmission function (transfer of upper layer PDUs)

Sequential delivery function (in-sequence delivery of upper layer PDUs)

Non-sequential delivery function (out-of-sequence delivery of upper layer PDUs)

automatic repeat request (ARQ) function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function

Error detection function (protocol error detection)

RLC SDU discard function

RLC re-establishment function

In the above, the in-sequence delivery function of an NR RLC entity refers to a function of delivering RLC SDUs, which are received from a lower layer, to a higher layer in order. The in-sequence delivery function may include a function of, when originally one RLC SDU is divided into multiple RLC SDUs and then received, reassembling the divided RLC SDUs and delivering the same, may include a function of rearranging the received RLC PDUs on the basis of RLC SNs or PDCP SNs, may include a function of rearranging the order and recording lost RLC PDUs, may include a function of reporting states of the lost RLC PDUs to a transmission side, may include a function of requesting to retransmit the lost RLC PDUs, and may include a function of, when there are lost RLC SDUs, delivering only RLC SDUs before the lost RLC SDUs to a higher layer in order. Alternatively, the in-sequence delivery function may include a function of, although there is a lost RLC SDU, if a predetermined timer has expired, delivering all RLC SDUs received before starting of the timer to a higher layer in order, or may include a function of, although there is a lost RLC SDU, if a predetermined timer has expired, delivering all RLC SDUs received up to the present time to a higher layer in order. In the above, the RLC PDUs may be processed in the order of reception thereof (in an order of arrival regardless of the order of the sequence numbers or sequence numbers) and may be delivered to the PDCP entity regardless of the order (out-of-sequence delivery). In the case of segments, segments stored in a buffer or to be received at a later time may be received, reconfigured into one complete RLC PDU, processed, and then may be delivered to the PDCP entity. The NR RLC layer may not include a concatenation function, and the function may be performed in an NR MAC layer or may be replaced with a multiplexing function of the NR MAC layer.

In the above, the out-of-sequence delivery function of the NR RLC entity refers to a function of delivering RLC SDUs received from a lower layer to an immediate higher layer regardless of the order, may include a function of, when originally one RLC SDU is divided into multiple RLC SDUs and received, reassembling and delivering the received RLC SDUs, and may include a function of storing the RLC SN or PDCP SN of the received RLC PDUs, arranging the order thereof, and recording lost RLC PDUs.

The NR MAC 1d-15 or 1d-30 may be connected to multiple NR RLC layer devices included in one terminal, and main functions of the NR MAC may include a part of the following functions:

Mapping function (mapping between logical channels and transport channels)

Multiplexing and demultiplexing function (multiplexing/demultiplexing of MAC SDUs)

Scheduling information reporting function (scheduling information reporting)

HARQ function (error correction through HARQ)

Function of priority handling between logical channels (priority handling between logical channels of one UE)

Function of adjusting priority between UEs (priority handling between UEs by means of dynamic scheduling)

MBMS service identification function

Transmission format selection function (transport format selection)

Padding function

The NR PHY layers 1d-20 and 1d-25 may perform channel-coding and modulation of higher layer data, make the channel-coded and modulated higher layer data into OFDM symbols, and transmit the OFDM symbols via a radio channel, or the NR PHY layers 1d-20 and 1d-25 may perform demodulation and channel-decoding of the OFDM symbols received through the radio channel, and deliver the same to a higher layer.

A procedure is provided in which a terminal compresses data when transmitting the data via an uplink and a base station decompresses the compressed data in a wireless communication system. More particularly, a method is provided for supporting data transmission/reception procedures in which a transmission end compresses and transmits data, and a reception end decompresses the data, e.g., a method for solving a problem when a decompression failure occurs, and formatting a header. The disclosed method may also be applied to a procedure in which, when a base station transmits downlink data to a terminal, the data is compressed and transmitted, and the terminal receives and decompresses the compressed downlink data. As described above, a transmission end compresses and transmits data so that more data can be transmitted, and the coverage can also be improved.

A UDC method successively performs data compression based on previous data. Therefore, if one piece of data in a series of compressed data is lost or discarded, or decompression of the data fails, data decompression fails for all data subsequent to the lost, discarded, or decompression-failed data.

The procedure of the user data compression method is performed by the transmission end PDCP layer device. Specifically, the transmission end PDCP layer device may drive a PDCP discard timer for each piece of data every time data is received from a higher layer device. If an uplink compression procedure has been configured, the transmission end PDCP layer device may apply the uplink compression procedure to data for which the uplink compression procedure is to be performed based on a transmission UDC buffer context, may calculate a checksum field based on the transmission UDC buffer context so as to obtain a checksum field value, may configure an indicator indicating whether UDC is applied and configure the indicator for a UDC header, and may update the transmission UDC buffer context based on raw data before compression is applied to the data for which the compression procedure has been applied. The transmission end PDCP layer device may generate a PDCP PDU by encoding the data for which the UDC has been performed, assigning a PDCP serial number thereto, and configuring a PDCP header, so as to transmit the generated PDCP PDU.

The reception end PDCP layer device may rearrange received data according to a PDCP sequence number or a COUNT value. Alternatively, when the RLC layer device arranges a sequence of the received data according to an RLC sequence number and delivers the same to the reception end PDCP layer device, the reception end PDCP layer device may identify whether a user data compression procedure (UDC) has been applied to each piece of data (e.g., PDCP PDU or PDCP SDU), by using an identifier of the UDC header, and may identify whether context of a transmission UDC buffer and context of a current reception UDC buffer are synchronized or identical, based on the checksum field value of the UDC header.

Configuration methods are described herein in which, when a base station transmits configuration information to a terminal via an RRC message so as to configure a function, a layer device or a bearer of the terminal enables prevention of processing delay due to unnecessary data processing, thereby more effectively performing data processing.

As described herein, a PDCP SDU indicates raw data received by a transmission PDCP layer device from a higher layer device, and a PDCP PDU may indicate data that is subject to all data processing in the transmission PDCP layer device and then to be transmitted to a lower layer device. The data processing may include processing, such as integrity protection and verification, header compression, user layer data compression, or ciphering procedure, which are configured in the PDCP layer device. In addition, a PDCP PDU which is generated by performing data processing on the PDCP SDU is separate data different from the PDCP SDU, the PDCP SDU is stored even if the PDCP PDU is discarded, and the PDCP SDU is discarded only by a PDCP data discard timer.

Figure 5:
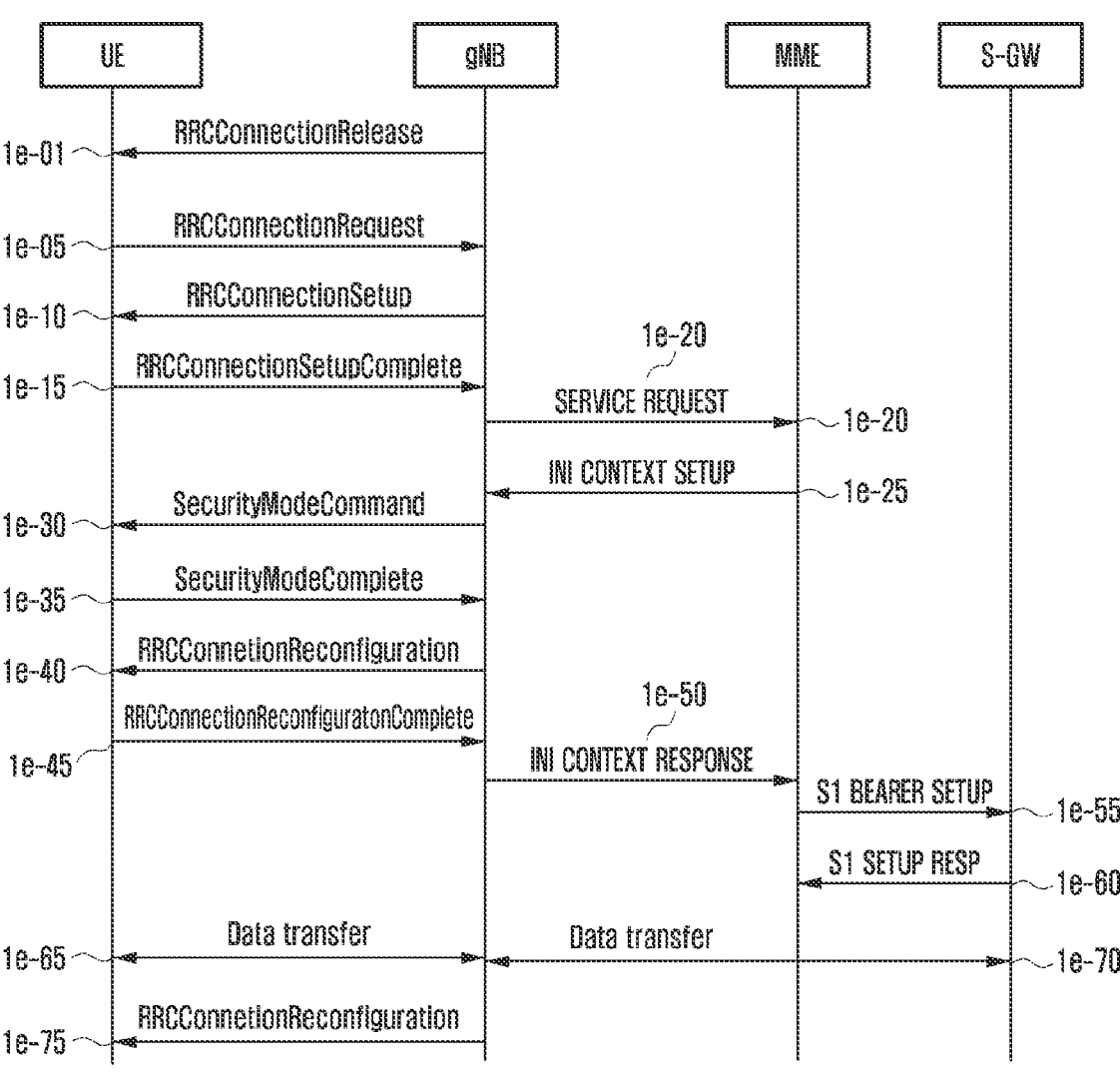
FIG. 5 illustrates a procedure of configuring whether a base station is to perform UDC when a terminal establishes a connection with a network according to an embodiment.

FIG. 5 illustrates a procedure of configuring whether a base station is to perform UDC when a terminal establishes a connection with a network according to an embodiment.

As illustrated in FIG. 5, a terminal switches from an RRC idle mode or an RRC inactive mode (or lightly-connected mode) to an RRC connected mode and establishes a connection with a network, and for configuring whether to perform UDC.

In FIG. 5, if a terminal that transmits or receives data in the RRC connected mode does not transmit or receive data for a predetermined reason or for a predetermined time period, a base station may transmit an RRCConnectionRelease message to the terminal to enable the terminal to be switched to the RRC idle mode, in step 1e-01. Subsequently, the terminal (i.e., the idle mode UE) to which no connection is currently established performs an RRC connection establishment procedure with the base station when data to be transmitted is generated. The terminal establishes reverse transmission synchronization with the base station via a random-access procedure and transmits an RRCConnection- Request message to the base station, in step 1e-05. The message includes an identifier of the terminal, a reason (establishmentCause) for establishing a connection, and the like.

The base station transmits an RRCConnectionSetup message in step 1e-10 so that the terminal establishes an RRC connection. The message may include information indicating whether to use a UDC method or whether to use a downlink data compression method for each logical channel (logicalchannelconfig), for each bearer, or for each PDCP entity (PDCP-config), or may include an indicator indicating whether to continue using a UDC context (or UDC protocol or UDC buffer context). Specifically, the RRCConnectionSetup message may indicate whether to use the UDC method only for a certain IP flow or a certain QoS flow in each logical channel, bearer, or PDCP device (or SDAP device) (information on an IP flow or a QoS flow, for which the UDC method is to be used or for which the same is not to be used, may be configured for the SDAP device so that the SDAP device may indicate, to the PDCP device, whether to use the UDC method with respect to each QoS flow. Alternatively, the PDCP device may identify each QoS flow by itself and determine whether to apply the UDC method). If it is indicated to use the UDC method, a predefined library to be used in the UDC method, an identifier for dictionary information, a buffer size to be used in the UDC method, or the like may be indicated. The message may include a command to release or set up for performing of uplink compression decompression. The above UDC method may always be configured with an RLC AM bearer (an ARQ function, a lossless mode with a retransmission function), and may not be configured together with a header compression protocol (e.g., ROHC) or an Ethernet header compression (EHC) method. The message includes RRC connection configuration information and the like. The RRC connection is also referred to as a signaling radio bearer (SRB) and is used for transmitting or receiving an RRC message which is a control message between the terminal and the base station.

The terminal having established the RRC connection transmits an RRCConnetionSetupComplete message to the base station, in step 1e-15. If the base station does not know a terminal capability of the terminal that is currently establishing a connection, or if the base station desires to identify a terminal capability, the base station may transmit a message asking about the terminal capability. The terminal may transmit a message reporting its own capability. The message may indicate whether the terminal is capable of using the UDC)method or is capable of using the downlink data compression method, and the message may be transmitted including an indicator indicating the same. The RRCConnetionSetupComplete message includes a control message referred to as a SERVICE REQUEST, which is for the terminal to request an MME to establish a bearer for a predetermined service. The base station transmits, in step 1e-20, the SERVICE REQUEST message included in the RRCConnetionSetupComplete message to the MME, and the MME determines whether to provide a service requested by the terminal.

As a result of the determination, if it is determined to provide the service requested by the terminal, the MME transmits an INITIAL CONTEXT SETUP REQUEST message to the base station, in step 1e-25. The message includes information, such as QoS information to be applied when a data radio bearer (DRB) is configured, and security-related information (e.g., a security key and a security algorithm) to be applied to the DRB. The base station exchanges a SecurityModeCommand message in step 1e-30 and a SecurityModeComplete message in step 1e-35 in order to establish security with the terminal. When the security configuration is completed, the base station transmits an RRCConnectionReconfiguration message to the terminal, in step 1e-40. The message may include information indicating whether to use the UDC method or whether to use the downlink data compression method for each logical channel (logicalchannelconfig), for each bearer, or for each PDCP device (PDCP-config), or may include an indicator indicating whether to continue using the UDC context (or UDC protocol or UDC buffer context). More specifically, the RRCConnectionSetup message may indicate whether to use the UDC method only for a certain IP flow or a certain QoS flow in each logical channel, bearer, or PDCP device (or SDAP device). Information on an IP flow or a QoS flow, for which the UDC method is to be used or for which the same is not to be used, may be configured for the SDAP device so that the SDAP device may indicate, to the PDCP device, whether to use the UDC method with respect to each QoS flow. Alternatively, the PDCP device may identify each QoS flow by itself and determine whether to apply the UDC method. If use the UDC method is indicated, a predefined library to be used in the UDC method, an identifier for dictionary information, a buffer size to be used in the UDC method, or the like may be indicated. The message may include a command to release or set up for performing of uplink compression decompression. The above UDC method may always be configured with an RLC AM bearer (an ARQ function, a lossless mode with a retransmission function), and may not be configured together with a header compression protocol (ROHC). The message includes configuration information of a DRB, via which user data is to be processed, and the terminal configures the DRB by applying the information and transmits an RRCConnectionReconfigurationComplete message to the base station, in step 1e-45.

The base station having completed DRB configuration with the terminal transmits an INITIAL CONTEXT SETUP COMPLETE message to the MME in step 1e-50, and the MME having received the message exchanges an S1 BEARER SETUP message and an S1 BEARER SETUP RESPONSE message in order to configure an S-GW and an S1 bearer, in steps 1e-055 and 1e-60. The S1 bearer is a data transmission connection established between the S-GW and the base station, and corresponds one-to-one to the DRB. When the above steps are completed, the terminal transmits data to or receives data from the base station via the S-GW in steps 1e-65 and 1e-70.

Likewise, a general data transmission procedure includes mainly the three stages of RRC connection configuration, security configuration, and DRB configuration. The base station may transmit an RRCConnectionReconfiguration message in order to newly perform, add, or change the configuration for the terminal for a predetermined reason, in step 1e-75. The message may include information indicating whether to use the UDC method or whether to use a downlink data compression method for each logical channel (logicalchannelconfig), for each bearer, or for each PDCP device (PDCP-config). More specifically, the RRCConnectionSetup message may indicate whether to use the UDC method only for a certain IP flow or a certain QoS flow in each logical channel, bearer, or PDCP device (or SDAP device). Information on an IP flow or a QoS flow, for which the UDC method is to be used or for which the same is not to be used, may be configured for the SDAP device so that the SDAP device may indicate, to the PDCP device, whether to use the UDC method with respect to each QoS flow.

Alternatively, the PDCP device may identify each QoS flow by itself and determine whether to apply the UDC method. If use the UDC method is indicated, a predefined library to be used in the UDC method, an identifier for dictionary information, a buffer size to be used in the UDC method, or the like may be indicated. The message may include a command to release or set up for performing of uplink compression decompression. The above UDC method may always be configured with an RLC AM bearer (an ARQ function, a lossless mode with a retransmission function), and may not be configured together with a header compression protocol (ROHC).

Herein, if the Ethernet header compression method (or ROHC header compression method) and the UDC compression method are configured at the same time via an RRC message (e.g., an RRCSetup message, an RRCResume message, or an RRCReconfiguration message), data processing burden and complexity are increased while a data compression rate is not significantly improved. Therefore, it may be restricted that the UDC compression method and the Ethernet header compression method (or the ROHC header compression method) are not configured at the same time. That is, the Ethernet header compression method (or the ROHC header compression method) may be configured for each uplink or downlink of the PDCP layer device, and may be configured when the UDC compression method is not configured. The UDC compression method may also be configured for each uplink or downlink of the PDCP layer device, and may be configured when the Ethernet header compression method (or the ROHC header compression method) is not configured. However, the Ethernet header compression method and the ROHC header compression method may be configured at the same time via the RRC message, so that a header compression procedure may be independently performed for each of an Ethernet header or a TCP/IP header so as to greatly improve a compression rate. Since the Ethernet header compression method is a feedback-based method and cannot be applied in a one-way or uni-directional link (e.g., a bearer which applies an RLC UM layer device and is capable of transmitting data only in one direction), the Ethernet header compression method may not be configured in the uni-directional link and may be configured only in a bi-directional link, via the RRC message.

If the UDC compression method is configured for downlink or uplink via the RRC message, the UDC compression method may be restricted that the out-of-sequence delivery function cannot be configured in an LTE RLC layer device connected to the LTE or NR PDCP layer device for which the UDC compression method is configured. If the out-of-order delivery function is configured, via the RRC message, in the LTE RLC layer device connected to the LTE or NR PDCP layer device, the out-of-order delivery function may be restricted that the UDC compression method cannot be configured. That is, if the out-of-order delivery function is not configured, via the RRC message, in the LTE RLC layer device connected to the LTE or NR PDCP layer device, the UDC compression method may be configured. If the out-of-order delivery function is configured for the NR PDCP layer device via the RRC message, the out-of-order delivery function may be restricted that the UDC compression method cannot be configured. That is, if the out-of-order delivery function is not configured for the NR PDCP layer device via the RRC message, the UDC compression method may be configured. The UDC compression method or the UDC decompression method disclosed herein may also be extended to the RLC UM mode so as to be configured for uplink or downlink.

If the UDC method is configured for downlink or uplink in PDCP layer device configuration information for each bearer via the RRC message, it may be restricted that the out-of-order delivery function cannot be configured in the LTE RLC layer device or the NR PDCP layer device, which is connected to the LTE or NR PDCP layer device for which the UDC method has been configured. This is because when the PDCP layer device performs a decompression procedure on data to which the UDC method has been applied, the decompression procedure should be applied in the ascending order of PDCP sequence numbers or COUNT values so that, if the PDCP layer device without an ordering function performs a decompression procedure out of order on data delivered out of order from the RLC layer device, a decompression failure occurs.

Herein, configuration methods are disclosed of, when a base station transmits configuration information to a terminal via an RRC message (e.g., an RRCRelease message, an RRCReconfiguration message, or an RRCResume message) so as to configure a function, a layer device, or a bearer of the terminal, enabling prevention of processing delay due to unnecessary data processing, and performing effective data processing. A base station or a network may apply the following configuration methods when transmitting configuration information to a terminal via an RRC message. Hereinafter, a transmission end may indicate a terminal, a base station or a network, and a reception end may indicate a base station, a network, or a terminal.

First configuration method: When the ROHC compression method is not configured or when the EHC compression method is not configured (or when the EHC compression method for downlink or uplink is not configured), the base station (or network) may enable configuration of the UDC compression method for the terminal. As another method, when the ROHC compression method is configured or when the EHC compression method is configured (or when the EHC compression method for downlink or uplink is not configured), the base station (or network) may not configure the UDC compression method for the terminal. By applying the first configuration method, the base station can prevent multiple unnecessary compression procedures from being configured for the terminal so as to prevent data processing and transmission delay.

1-1th configuration method: When the ROHC compression method is not configured or when the EHC compression method is not configured (or when the EHC compression method for uplink is not configured), the base station (or network) may enable configuration of the UDC compression method for the terminal. As another method, when the ROHC compression method is configured or when the EHC compression method is configured (or when the EHC compression method for uplink is not configured), the base station (or network) may not configure of the UDC compression method for the terminal. That is, since the EHC compression method may be configured for uplink or downlink, and the UDC compression method may be configured only for uplink, only configuration of the EHC compression method and configuration of the UDC compression method for uplink are restricted, and the EHC compression method and the UDC compression method for downlink may be configured together. By applying the 1-1th configuration method, the base station can prevent multiple unnecessary compression procedures from being configured for the terminal so as to prevent data processing and transmission delay.

Second configuration method: When the base station (or network) configures the UDC compression method, if the PDCP layer device of the terminal, for which the UDC compression method is configured, is an LTE (or E-UTRA) PDCP layer device, the UDC compression method may not be configured in a case where the PDCP layer device uses reordering, in a case of being configured as a split bearer, or in a case of being configured as an LTE-WLAN aggregation (LWA) bearer. As another method, when the base station (or network) configures the UDC compression method, if the PDCP layer device of the terminal, for which the UDC compression method is configured, is an E-UTRA PDCP layer device, the UDC compression method may be configured only in a case where the PDCP layer device does not use reordering (or a case where a reordering timer is not configured or is not driven), in a case of not being configured as a split bearer, in a case of not being configured as an LWA bearer, or in a case where the PDCP layer device is connected to an RLC layer device operating in an AM mode. The implementation complexity of the LTE (or E-UTRA) PDCP layer device can be reduced via the configuration method as described above, and a decompression failure due to data loss can be reduced by allowing configuration of the UDC compression method only for the PDCP layer device connected to the RLC layer device operating in the AM mode. However, when the base station (or network) configures the UDC compression method, if the PDCP layer device of the terminal, for which the UDC compression method is configured, is an NR PDCP layer device, the UDC compression method may be configured even in a case of using reordering (or a case where a reordering timer is configured or driven), in a case of being configured as a split bearer, or in a case of being configured as an LWA bearer. Since the NR PDCP layer device supports many services, the UDC compression method may be allowed in the above cases to increase a degree of freedom in network configuration, or may also be configurable for a structure in which multiple RLC layer devices (RLC layer devices operating in the AM mode or operating in the UM mode) are connected to a single PDCP layer device, so that many data transmission paths are configured for the UDC compression method which is vulnerable to data loss, so as to increase transmission reliability. When the NR PDCP layer device performs a reordering procedure or when a reordering timer is running, a reception end may perform a UDC decompression procedure in ascending order of PDCP sequence numbers or COUNT values after the reordering timer expires.

2-1th configuration method: When the base station (or network) configures the UDC compression method, if the PDCP layer device of the terminal, for which the UDC compression method is configured, is an LTE (or E-UTRA) PDCP layer device, the UDC compression method may not be configured in a case where the PDCP layer device uses reordering, in a case of being configured as a split bearer, or in a case of being configured as an LWA bearer. As another method, when the base station (or network) configures the UDC compression method, if the PDCP layer device of the terminal, for which the UDC compression method is configured, is an E-UTRA PDCP layer device, the UDC compression method may be configured only in a case where the PDCP layer device does not use reordering (or a case where a reordering timer is not configured or is not driven), in a case of not being configured as a split bearer, in a case of not being configured as an LWA bearer, or in a case where the PDCP layer device is connected to an RLC layer device operating in the AM mode. The implementation complexity of the LTE (or E-UTRA) PDCP layer device can be reduced via the configuration method as described above, and a decompression failure due to data loss can be reduced by allowing configuration of the UDC compression method only for the PDCP layer device connected to the RLC layer device operating in the AM mode. However, when the base station (or network) configures the UDC compression method, if the PDCP layer device of the terminal, for which the UDC compression method is configured, is an NR PDCP layer device, the UDC compression method may be configured only in a case of using reordering (or a case where a reordering timer is configured or driven), in a case of being configured as a split bearer, in a case of being configured as an LWA bearer, or in a case where one or multiple RLC layer devices connected to the PDCP layer device (or bearer) operate (or are configured to be) in the AM mode. Since the NR PDCP layer device supports many services, the UDC compression method may be allowed in the above cases in order to increase a degree of freedom in network configuration, or may also be configurable for a structure in which multiple RLC layer devices are connected to a single PDCP layer device, with the UDC compression method being configured only for the bearer (or split bearer) connected to the RLC layer device operating in the AM mode, and many data transmission paths are configured for the UDC compression method which is vulnerable to data loss, so as to increase transmission reliability. That is, it may be restricted that the UDC compression method cannot be configured for the PDCP layer device connected to an RLC layer device operating in the UM mode. As another method, the UDC compression method may be configured only in a case where at least one RLC layer device among multiple RLC layer devices connected to the PDCP layer device operates in the AM mode. When the NR PDCP layer device performs a reordering procedure or when a reordering timer is running, a reception end may perform a UDC decompression procedure in ascending order of PDCP sequence numbers or COUNT values after the reordering timer expires.

Third configuration method: When the base station (or network) configures the UDC compression method, if an out-of-order delivery indicator (PDCP out-of-order delivery) is configured for the PDCP layer device of the terminal, for which the UDC compression method is configured, it may be restricted that the UDC compression method cannot be configured. As another method, when the base station (or network) configures the UDC compression method, if an out-of-order delivery indicator (PDCP out-of-order delivery) is not configured for the PDCP layer device of the terminal, for which the UDC compression method is configured, the UDC compression method may be configured. That is, by preventing the UDC compression method and the out-of-order delivery function of the PDCP layer device from being configured at the same time, occurrence of an error can be prevented in the UDC compression method in which a decompression procedure needs to be performed in order.

Fourth configuration method: When configuring the UDC compression method, when reconfiguring (e.g., configuring for the first time) the configuration of the PDCP layer device via an RRC message, or when configuring ReconfigurationWithSync (e.g., when changing a handover or cell group), the base station (network) may indicate (or configure), using an indicator, to continuously use, as it is, a UDC compression context or a UDC buffer in the PDCP layer device of the terminal using the UDC compression method, and the indicator may be indicated only for uplink. Alternatively, the indicator may be indicated only when security key configuration information is not changed, or may be configured together with an indicator indicating a PDCP data recovery procedure to the terminal. If a security key is changed, the UDC compression method should be newly applied to data (PDCP SDU), and a security procedure (a ciphering procedure or an integrity protection procedure) should be newly applied with the updated security key. This is because, if the UDC compression context or the UDC buffer is not initialized, applying the UDC compression method again to the same data is very complicated in implementation. That is, in the UDC compression procedure, the UDC compression context or the UDC buffer is continuously changed due to association of previous data.

As another method, the base station (network) may indicate (or configure), using an indicator, to continuously use, as it is, a UDC compression context or a UDC buffer in the PDCP layer device of the terminal using the UDC compression method (e.g., the configuration may be performed even when the security key is changed), or may also indicate, using the indicator, the terminal to perform a PDCP re-establishment procedure. When the terminal performs the PDCP re-establishment procedure as above, if the indicator is not configured, the UDC compression buffer may be initialized (e.g., all buffer values may be configured to 0), or if a preconfigured value (e.g., pre-dictionary or dictionary) of the buffer is configured, the buffer may be reset or filled with the preconfigured value (as another method, whether or not to fill the buffer with the preconfigured value may also be configured). As another method, when the terminal performs the PDCP re-establishment procedure as above, the UDC compression buffer may always be initialized (e.g., all buffer values may be configured to 0), or if a preconfigured value (e.g., pre-dictionary or dictionary) of the buffer is configured, the buffer may be initialized or filled with the preconfigured value (as another method, whether or not to fill the buffer with the preconfigured value may also be configured).

In the PDCP re-establishment procedure, when performing a transmission or retransmission procedure on data in ascending order of COUNT values or PDCP sequence numbers, starting with first data (PDCP SDU) for which a successful delivery from a lower layer device has not been identified, if the ROHC compression method or the EHC compression method is configured, the terminal may perform the ROHC compression method or the EHC compression method on the data, or if the UDC compression method is configured, the terminal may perform the UDC compression method on uplink data (PDCP SDU).

As another method, when the UDC compression method is configured in the data transmission or retransmission procedure of the PDCP re-establishment procedure, the UDC compression method may be performed on uplink data (PDCP SDU) only when the indicator indicating to continuously use, as it is, the UDC compression context or the UDC buffer is not configured.

As another method, when the UDC compression method is configured in the data transmission or retransmission procedure of the PDCP re-establishment procedure, the UDC compression method may not be newly performed for uplink data (PDCP SDU), only a security procedure (a ciphering procedure or an integrity protection procedure) may be applied to existing (or previous) compressed data by using a new security key, and the data may be processed so as to be transmitted to a lower layer device. This is because, in newly applying the UDC compression method to the data (PDCP SDU) again, if the UDC compression context or the UDC buffer is not initialized, re-applying the UDC compression method to the same data is very complicated in implementation. This is because, in the UDC compression procedure, the UDC compression context or the UDC buffer is continuously changed due to association of previous data.

The base station may indicate, using an indicator of the RRC message, whether or not the terminal is to perform the PDCP re-establishment procedure, and when an indicator (reestablishPDCP) indicating the PDCP re-establishment procedure is indicated or when an indicator indicating to continuously use the UDC compression buffer (or UDC protocol context) is not configured via the RRC message, the terminal may perform a procedure for releasing UDC configuration information or the UDC compression method. When performing the PDCP re-establishment procedure, if the UDC compression method or UDC configuration information is newly configured via the RRC message, the terminal may newly configure and initialize the UDC compression buffer, and apply the UDC compression method. That is, the procedure of releasing the UDC configuration information or the UDC compression method as above may be performed before applying the newly configured UDC compression method-related configuration information in the PDCP layer device configuration information of the RRC message.

Fifth configuration method: When the base station (or network) configures the UDC compression method for bearers, it may be restricted that the UDC compression method may not be configured for an SRB and may be configured only for DRBs. This is because even if the UDC compression method is configured for the SRB, a compression rate is not greatly improved, and only the complexity of terminal implementation is increased.

As another method, when the base station (or network) configures the UDC compression method for bearers, it may be restricted that the UDC compression method may not be configured for an SRB and may be configured only for a bearer configured with an RLC layer device operating in the AM mode from among DRBs. This is because, in a case of a bearer configured with an RLC layer device operating in the UM mode in which data loss may occur, a UDC decompression failure frequently occurs, resulting in performance degradation. Therefore, when the indicator (reestablishPDCP) indicating the PDCP re-establishment procedure is indicated or when an indicator indicating to continuously use the UDC compression buffer (or UDC protocol context) is not configured via the RRC message, the terminal may perform a procedure for releasing UDC configuration information or the UDC compression method for only a DRB or a non-SRB case (or only for an AM DRB configured with an RLC layer device using the AM mode).

When performing the PDCP re-establishment procedure, if the UDC compression method or UDC configuration information is newly configured via the RRC message, the terminal may newly configure and initialize the UDC compression buffer and apply the UDC compression method. That is, the procedure of releasing the UDC configuration information or the UDC compression method may be performed before applying the newly configured UDC compression method-related configuration information in the PDCP layer device configuration information of the RRC message.

Sixth configuration method: When the RRC message is received, the procedure of releasing UDC configuration information or the UDC compression method may be performed. If the UDC compression method or the UDC configuration information is newly configured via the RRC message, the terminal may newly configure and initialize the UDC compression buffer and apply the UDC compression method. That is, the procedure of releasing the UDC configuration information or the UDC compression method may be performed before applying the newly configured UDC compression method-related configuration information in the PDCP layer device configuration information of the RRC message.

Seventh configuration method: When the terminal moves in an RRC INACTIVE mode and transmits, or is to transmit an RRCResumeRequest message due to the necessity of establishing an RRC connection, stored configuration information of the terminal may be recovered, and when the configuration information is recovered, the UDC compression method or UDC-related configuration information is excluded. As another method, when the terminal moves in the RRC INACTIVE mode and transmits or is to transmit an RRCResumeRequest message due to the necessity of establishing an RRC connection, stored configuration information of the terminal may be recovered. If the UDC buffer context or the indicator indicating to continuously use the UDC configuration information is not configured via the RRC message (e.g., RRCRelease), when the configuration information is recovered, the UDC compression method or UDC-related configuration information is excluded.

Figure 6:
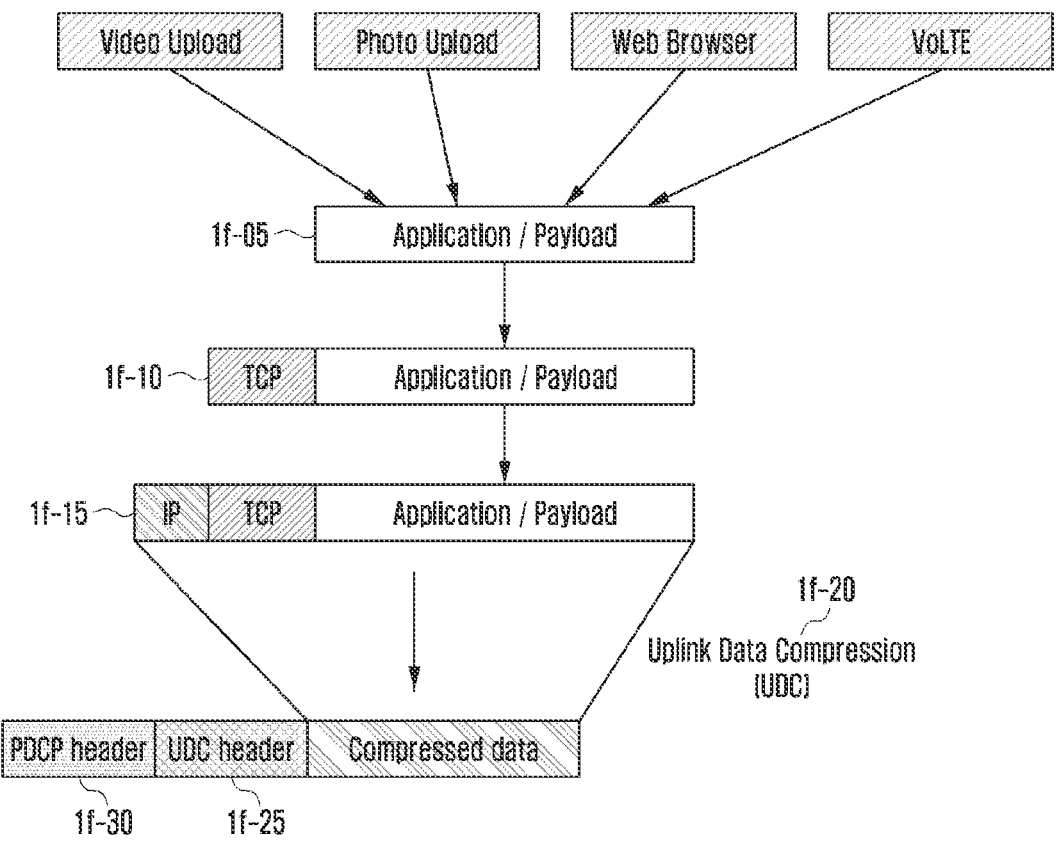
FIG. 6 illustrates a data configuration and a procedure of performing UDC according to an embodiment.

FIG. 6 illustrates a data configuration and a procedure of performing uplink or downlink data compression according to an embodiment.

In FIG. 6, uplink data 1f-05 may be generated as data corresponding to services, such as video transmission, photo transmission, web search, and VoLTE. Data generated by an application layer device may be processed via a UDP or a TCP/IP corresponding to a network data transmission layer, may be used to configure respective headers 1f-10 and 1f-15, and may be delivered to a PDCP layer. When the PDCP layer receives data (PDCP SDU) from a higher layer, the following procedure may be performed.

If a UDC method is configured to be used in the PDCP layer via an RRC message such as in step 1e-10, 1e-40, or 1e-75 in FIG. 5, the UDC method may be performed with respect to the PDCP SDU, as shown in step 1f-20, so as to compress uplink data, a corresponding UDC header (header for compressed uplink data) 1f-25 may be configured, ciphering may be performed on compressed data except for the UDC header, integrity protection may be performed if integrity protection is configured, and a PDCP PDU may be configured by configuring the PDCP header 1f-30. The PDCP layer device includes a UDC compression/decompression device, determines whether or not to perform UDC procedure for each piece of data as configured in the RRC message, and uses the UDC compression/decompression device. A transmission end performs data compression using the UDC compression device in a transmission PDCP layer device, and a reception end performs data decompression using the UDC decompression device in a reception PDCP layer device.

The procedure of FIG. 6 described above may be applied not only when the terminal performs UDC but also when downlink data compression is performed. In addition, the description for the uplink data may be applied to the downlink data in the same manner.

Figure 7:
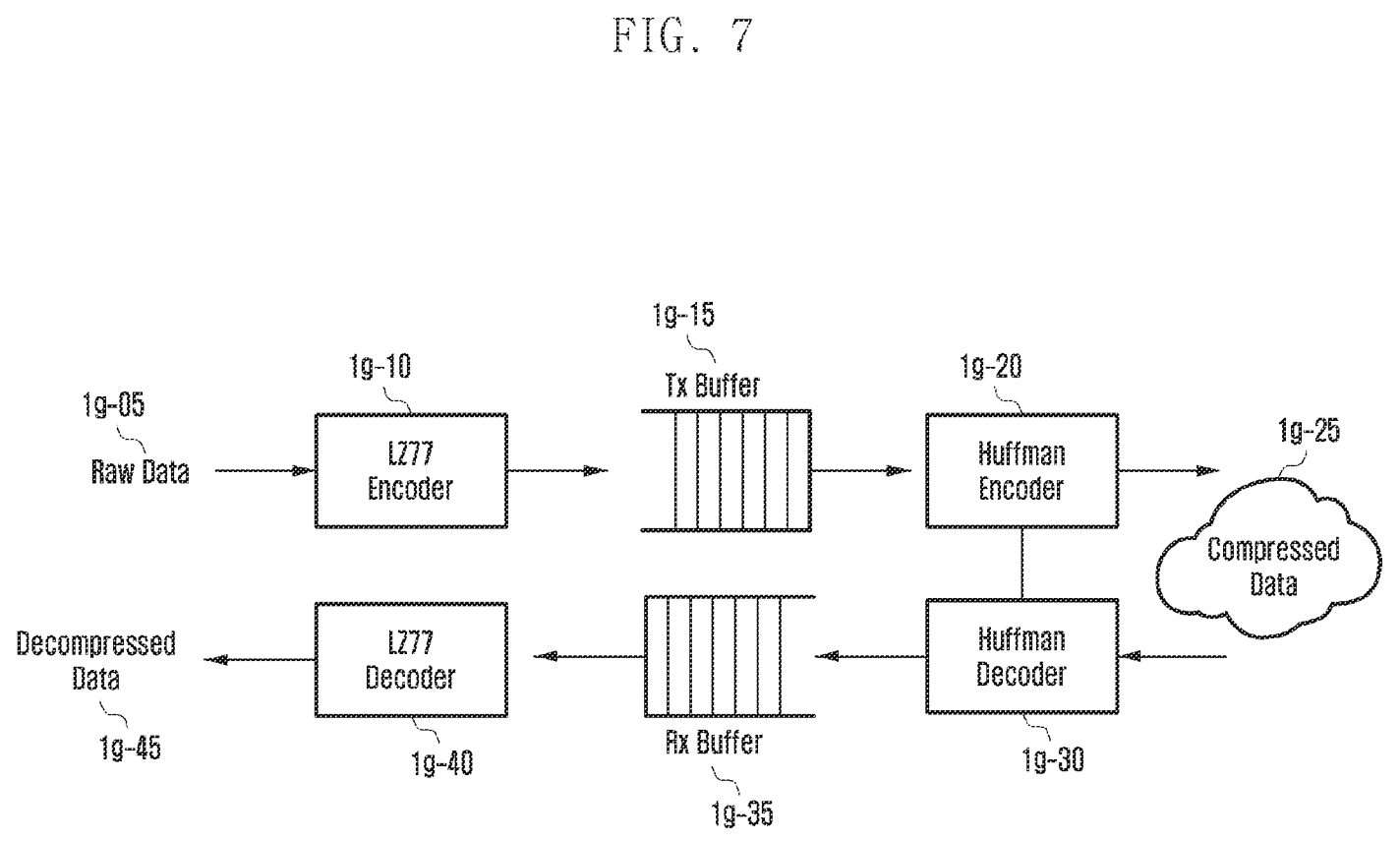

FIG. 7 illustrates a UDC method according to an embodiment.

FIG. 7 illustrates a DEFLATE-based UDC algorithm, and the DEFLATE-based UDC algorithm is a lossless compression algorithm. The DEFLATE-based UDC algorithm basically compresses uplink data by combining the LZ77 algorithm and Huffman coding. The LZ77 algorithm performs an operation of searching for duplicate arrays of data. When searching for duplicate arrays, if duplicate arrays are found by searching for duplicate arrays via a sliding window, a position and a degree of duplication of the duplicate arrays in the sliding window are expressed as a length so that data compression is performed. The sliding window is also referred to as a buffer in the UDC method, and may be configured to be 8 kilobytes or 32 kilobytes. That is, the sliding window or buffer may perform compression by recording 8192 or 32768 characters, searching for duplicate arrays, and expressing the same by position and length. Therefore, since the LZ algorithm is a sliding-window scheme, that is, previously coded data is updated in a buffer and coding is performed again on immediately subsequent data, there is a correlation between successive data. Accordingly, the data coded first should be decoded normally so as to enable normal decoding of the subsequent data. The compressed codes (expressions of position, length, etc.) expressed by position and length according to the LZ77 algorithm are compressed one more time via Huffman coding. In the Huffman coding, while searching for duplicate codes again, compression is performed again by using a short notation for codes with a high degree of duplication and using a long notation for codes with a low degree of duplication. The Huffman coding is prefix coding, and is an optimal coding scheme in which all codes are clearly distinguished (uniquely decodable).

As described above, the transmission end may perform encoding in step 1g-10 by applying the LZ77 algorithm to raw data 1g-05, may update the buffer in step 1g-15, and may generate checksum bits for contents (or data) of the buffer so as to configure the same for the UDC header. The checksum bits are used in the reception end in order to determine whether the buffer state is valid. Codes encoded with the LZ77 algorithm may be compressed one more time with Huffman coding so as to be transmitted by performing Huffman encoding in step 1g-20 as compressed uplink data in step 1g-25. The reception end performs a decompression procedure on the received compressed data, contrary to the transmission end. That is, the reception end performs Huffman decoding in step 1g-30, updates the buffer in step 1g-35, and identifies the validity of the updated buffer via the checksum bits of the UDC header. If the checksum bits are determined not to have any error, the reception end may perform decoding via the LZ77 algorithm in step 1g-40 and may decompress data and reconstruct the raw data so as to deliver the reconstructed data to a higher layer in step 1g-45.

As described above, since the LZ algorithm is a sliding-window scheme, that is, previously coded data is updated in the buffer and coding is performed again on immediately subsequent data, there is a correlation between successive data. Accordingly, the data coded first should be decoded normally so as to enable normal decoding of the subsequent data. Therefore, a reception PDCP layer device identifies a PDCP sequence number of a PDCP header and identifies a UDC header (identifies an indicator indicating whether data compression has been performed or not) so as to perform a data compression procedure on data, to which a data compression procedure has been applied, in ascending order of PDCP sequence numbers.

A procedure in which a base station configures UDC for a terminal, and a procedure in which a terminal performs UDC according to an embodiment are described herein.

A base station may configure or release, for a terminal, performing of UDC on a logical channel or a bearer, in which an RLC AM mode is configured, via an RRC message such as in step 1e-10, 1e-40, or 1e-75 in FIG. 5. In addition, the base station may reset a UDC device (or protocol) of a PDCP layer device of the terminal by using the RRC message. The resetting of the UDC device (or protocol) implies resetting of a UDC buffer for UDC of the terminal, and is performed to synchronize a UDC buffer of the terminal with a UDC buffer for uplink data decompression of the base station. The resetting of a buffer of the UDC device may define a new PDCP control PDU so that a transmission end (base station) resets a UDC buffer of a reception end (terminal) and performs synchronization for user data compression/decompression between the transmission end and the reception end, by using the PDCP control PDU instead of the RRC message. The base station may configure whether to perform UDC, for each bearer, each logical channel, or each PDCP layer device by using the RRC message. More specifically, the base station may configure whether to perform or not to perform uplink data decompression for each IP flow (or QoS flow) in one bearer, logical channel, or PDCP layer device.

The base station may configure a PDCP discard timer value for the terminal via the RRC message. As the PDCP discard timer value, a PDCP discard timer value for data for which UDC is not performed, and a PDCP discard timer value for data to which UDC is applied may be configured separately.

If the terminal is configured, via the RRC message, to perform UDC on a predetermined bearer, logical channel, or PDCP layer device (or some QoS flows of a predetermined bearer, logical channel, or PDCP layer device), the terminal resets a buffer in a UDC device of the PDCP layer device according to the configuration, and prepares an UDC process. In addition, when the terminal receives data (PDCP SDU) from a higher layer and is configured to perform UDC on the PDCP layer device, the terminal performs UDC on the received data. If the terminal is configured to perform UDC on only particular QoS flows of the PDCP layer device, the terminal identifies a QoS flow identifier or an indication of a higher SDAP layer so as to determine whether to perform UDC, and then performs UDC. If the terminal performs UDC and updates a buffer according to the data compression, the terminal configures a UDC buffer. If the terminal performs UDC, as above, a PDCP SDU received from a higher layer may be compressed into UDC compression data (UDC block) having a smaller size. In addition, a UDC header for the compressed UDC compression data is configured. The UDC header may include an indicator indicating whether UDC has been performed or not (e.g., if a 1-bit indicator of the UDC header is 0, this indicates that UDC has been applied, and if the indicator is 1, this indicates that no UDC has been applied). A case where no UDC has been applied may include a case where, since a PDCP SDU data structure received from a higher layer is not a repetitive data structure, data compression cannot be performed according to the above described UDC compression method (DEFLATE algorithm) In the above description, if the terminal performs UDC on data (PDCP SDU) received from a higher layer and updates a UDC buffer, the terminal may calculate checksum bits and add the calculated checksum bits to the UDC buffer in order for a reception end PDCP layer device to identify the validity of the updated UDC buffer (the checksum bits have a predetermined length, and may be configured by 4 bits, for example). A transmission PDCP layer device may initialize a transmission UDC buffer and may define and configure 1 bit in a UDC header 1i-02 of first data, to which UDC compression is newly applied after the initialization of the transmission UDC buffer, so as to indicate a reception PDCP layer device to initialize a reception UDC buffer and newly perform UDC decompression on the data for which the UDC header 1i-02 is configured, by using the initialized reception UDC buffer. For example, the transmission PDCP layer device may define an FR field as shown in step 1i-05 of FIG. 9, and may perform indication via the FR field. Whether the transmission PDCP layer device, for which the UDC compression procedure is configured, has applied the UDC compression procedure to data received from a higher layer may be defined by 1 bit, e.g., an FU field 1i-10, and may be indicated via the FU field.

The terminal performs ciphering on data to which uplink data decompression has been applied or data to which no uplink data decompression has been applied, and if integrity protection is configured, the terminal performs integrity protection and delivers the data to a lower layer.

Figure 8:
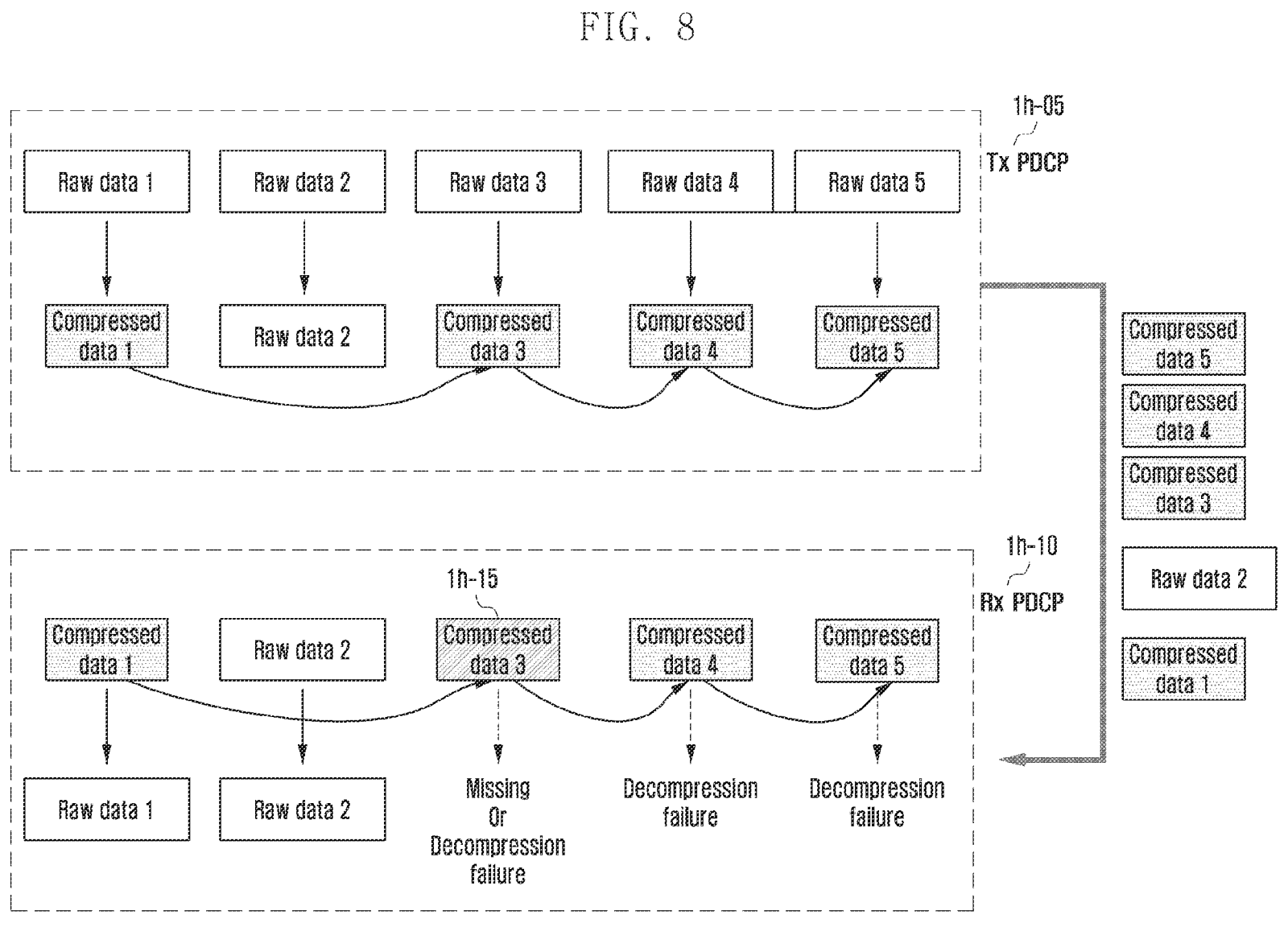

FIG. 8 illustrates a problem that a decompression failure of an uplink or downlink data compression method occurs, described according to an embodiment.

As described above with reference with FIG. 7, an algorithm (DEFLATE algorithm (performing Huffman coding after the LZ77 algorithm is performed)) for performing of UDC is a scheme in which, when a transmission end performs data compression, the transmission end updates previously compressed data in a buffer, compares, based on the buffer, the data with data that is to be subsequently compressed, searches for a repetitive structure, and compresses the structure by position and length. Therefore, decompression may succeed only if a reception end performs decompression in a sequence based on which the transmission has performed compression. For example, if the transmission end has performed UDC compression on data having PDCP sequence numbers 1, 3, 4, and 5 without performing UDC compression on data having PDCP sequence number 2 in step 1h-05, the reception end also needs to perform decompression on received data in a PDCP layer device in a sequence of PDCP sequence numbers 1, 3, 4, and 5 in order to successfully perform the decompression. When the transmission end performs UDC compression as above, this is indicated by a UDC header, and therefore the reception end may also determine whether UDC compression has been applied, by identifying the UDC header. If compressed data 1h-15 corresponding to PDCP sequence number 3 is lost during a procedure of performing a series of UDC decompression, all subsequent UDC decompression will fail. That is, UDC decompression cannot be performed on data having PDCP sequence numbers 4 and 5, in step 1h-10. Accordingly, there should be no lost data (packet) in an uplink decompression procedure, and the reception end needs to perform decompression in a sequence, based on which the transmission end has performed UDC compression on data. Therefore, an RLC AM mode having a retransmission function without loss needs to be operated.

However, lost data, as described above, may be incurred by a PDCP discard timer of the PDCP layer device. That is, the PDCP layer device drives a timer with a PDCP discard timer value configured via the RRC message for each data (packet or PDCP SDU) received from a higher layer. If the timer expires, the PDCP layer device discards data corresponding to the timer. Therefore, if a timer of data for which UDC compression has been performed expires, the data may be discarded, so that the reception end may fail to perform UDC decompression on UDC-compressed data thereafter.

As described with reference to FIG. 7, according to an algorithm (DEFLATE algorithm (performing Huffman coding after the LZ77 algorithm is performed)) for performing UDC, when a transmission end performs UDC, UDC is performed, and then the transmission end generates checksum by using current buffer contents so as to configure the same in a UDC buffer. The algorithm is a scheme of updating the buffer by using raw data of compressed data, comparing, based on the buffer, the raw data with data to be subsequently compressed, searching for a repetitive structure, and compressing the structure by the position and length. In the above, checksum bits in a UDC header are configured to determine the validity of a current state of the buffer before a UDC device (or function) of a reception end PDCP layer device performs data decompression. That is, before performing data decompression, the reception end identifies the validity of a current reception end UDC buffer via the checksum bits in the UDC header, the reception end performs data decompression if there are no checksum error, and if a checksum failure occurs, the reception end does not perform data decompression and needs to report the checksum failure to the transmission end and recover from the failure.

Decompression may succeed only if the reception end performs decompression in a sequence based on which the transmission end has performed compression. For example, if the transmission end has performed UDC compression on data having PDCP sequence numbers 1, 3, 4, and 5 without performing UDC compression on data having PDCP sequence number 2, the reception end also needs to perform decompression on received data in the PDCP layer device in a sequence of PDCP sequence numbers 1, 3, 4, and 5 in order to successfully perform the decompression. When the transmission end performs UDC compression as above, this is indicated by a UDC header, and therefore the reception end may also determine whether UDC compression has been applied, by identifying the UDC header. If a checksum failure occurs at PDCP sequence number 3 in the procedure of performing a series of UDC decompression, all subsequent UDC decompression may fail. That is, UDC decompression cannot be performed successfully on data having PDCP sequence numbers 4 and 5.

A checksum failure processing method is disclosed for solving the checksum failure problem described above.

Figure 9:
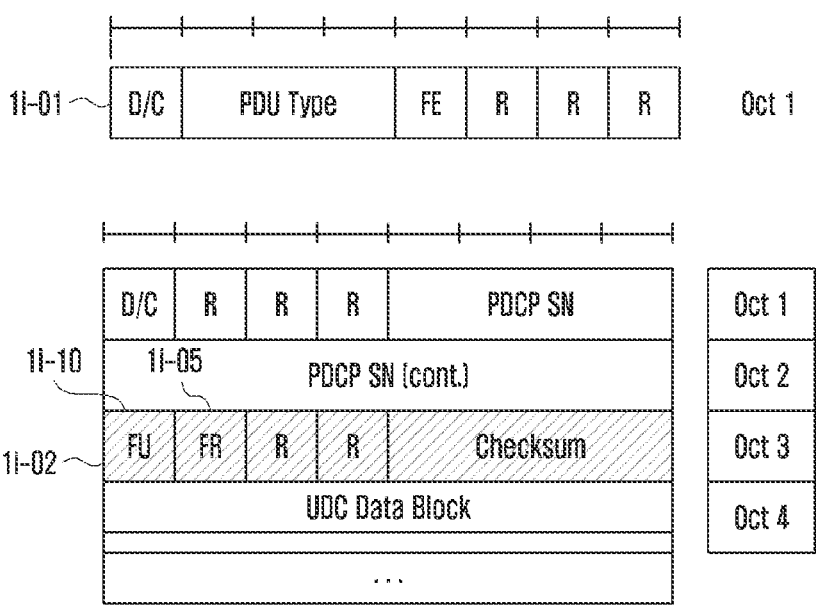
FIG. 9 illustrates a PDCP control PDU format which may be applied in a checksum failure processing method according to an embodiment.

FIG. 9 illustrates a PDCP control PDU format which may be applied in a checksum failure processing method according to an embodiment.

In FIG. 9, a data/control (D/C) field distinguishes between normal data and PDCP layer control information (PDCP control PDU) in a PDCP layer, and a PDU Type field indicates a type of information in the PDCP layer control information. As a PDCP control PDU format for feedback in a checksum failure processing method as described herein, a 1-bit indicator (e.g., FE field) indicating whether a checksum failure has occurred or not may be defined and used, as in step 1*i*-01. If the value of the 1-bit indicator is 0, this may indicate that UDC decompression is being performed normally, and if the value of the 1-bit indicator is 1, this may indicate that a checksum failure has occurred during UDC decompression and may indicate to initialize (reset) a UDC buffer of a transmission PDCP layer device.

To define a format, as in step 1*i*-01, reserved values (e.g., 011 or any reserved value between 100 and 111) may be assigned to a PDU type so as to define a new PDCP control PDU, and a PDCP control PDU having the defined PDU type may serve as feedback indicating a checksum failure, as summarized in Table 1, below.

TABLE 1

| PDU type | |
| --- | --- |
| Bit | Description |
| 000 | PDCP status report |
| 001 | Interspersed ROHC feedback packet |
| 010 | LWA status report |
| 011 | UDC checksum failure feedback |
| 100-111 | reserved |

An embodiment related to a checksum failure processing method, to which the PDCP control PDU described in FIG. 9 is applied, is described herein.

If a reception end (base station) identifies a checksum failure of a reception UDC buffer for data, for which UDC is to be released, the reception end transmits a PDCP control PDU to a terminal so as to indicate that a checksum failure has occurred. A new PDCP control PDU may be defined and used as the PDCP control PDU, and a new indicator may be defined and then included in an existing PDCP control PDU, whereby the existing PDCP control PDU may be modified and used. As another method, instead of a PDCP sequence number, a checksum failure has occurred, so that an indicator indicating to reset a UDC buffer may be defined and may indicate the reset.

Operation of the reception end: If a checksum failure has occurred, the reception end may immediately initialize the UDC buffer. Further, the reception end rearranges newly received data according to PDCP sequence numbers, and then identifies a UDC header of each data in ascending order of the PDCP sequence numbers. The reception end may discard data, which includes an indicator indicating that a transmission end UDC buffer has been reset due to a UDC checksum failure, includes no indication indicating initialization of the reception UDC buffer, and is indicated such that UDC compression has been performed. Further, for data in which the UDC header of newly received data does not include an indicator indicating that the transmission end UDC buffer has been reset due to a UDC checksum failure, and which is indicated such that UDC compression has not been performed, if all the data is received without a gap in the middle of the PDCP sequence numbers, the reception end may process the data in ascending order of the PDCP sequence numbers and then deliver the same to a higher layer device. The reception end may initialize the reception UDC buffer from data which includes an indicator indicating resetting of the reception UDC buffer and indicating that the transmission end UDC buffer has been reset due to a UDC checksum failure, and may resume decompression on UDC-compressed data in ascending order of the PDCP sequence numbers.

Operation of the transmission end: A transmission end (terminal) may reset (initialize) a UDC transmission buffer when the PDCP control PDU is received. If there is data (e.g., PDCP PDU) which has not been transmitted yet among data generated via a UDC compression procedure, the transmission end may discard the data before the initialization of the UDC transmission buffer. The transmission end may perform UDC again on raw data (e.g., PDCP SDU) of the data which has not been transmitted yet, based on the initialized transmission UDC buffer, may update the UDC buffer, may add checksum bits to a UDC header, may perform ciphering of the UDC header and a data part, may generate a PDCP header, and may configure a PDCP PDU so as to deliver the same to a lower layer. In addition, the transmission end may include, in the UDC header or the PDCP header of the newly configured PDCP PDU, an indicator indicating that the transmission end buffer has been reset or an indication indicating initialization of the reception end buffer, so as to deliver the UDC header or the PDCP header, and may newly assign, in ascending order, PDCP sequence numbers which have not been transmitted yet. That is, if data which has been ciphered with a PDCP sequence number, an HFN, or a COUNT value and a security key so as to be transmitted is ciphered again with the same PDCP COUNT value and the security key and is then retransmitted, the risk of hacking increases, and thus a rule in which one PDCP COUNT value allows one time of ciphering and transmission may be conformed to. As another method, the transmission end may reset the transmission UDC buffer when an indication indicating that a checksum failure has occurred is received, may newly perform UDC compression only for a PDCP PDU to be newly configured, or data having a PDCP sequence number greater than or equal to that of data which has not been transmitted to the lower layer from the transmission end, and may deliver the compressed data or PDCP PDU to the lower layer. In addition, the transmission end may include, in a UDC header or a PDCP header of the newly configured PDCP PDU, an indicator indicating that the transmission end UDC buffer has been reset (or an indicator indicating to reset the reception end buffer) and deliver the UDC header or the PDCP header. That is, if data which has been ciphered with a PDCP COUNT value and a security key so as to be transmitted is ciphered again with the same PDCP COUNT value and the security key and is then retransmitted, the risk of hacking increases, and thus a rule in which one PDCP COUNT value allows one time of ciphering and transmission may be conformed to.

Accordingly, efficient transmission end PDCP layer device operation is provided or a reception end PDCP layer device operation is provided for preventing unnecessary data transmission in response to a checksum failure that may occur in the user data compression or decompression procedure.

Specifically, when an UDC procedure is configured, the transmission PDCP layer device may apply the UDC procedure to 1-1th data (e.g., PDCP SDU) in the first data (e.g., PDCP SDU) received from a higher layer device, and may indicate, using the indicator of the UDC header, that the UDC compression procedure has been applied. Further, the transmission PDCP layer device may not apply the UDC procedure to 2-1th data (e.g., PDCP SDU), and may indicate, using the indicator of the UDC header, that the UDC compression procedure has not been applied. The 1-1th data may include general data received from a higher layer device (e.g., an application layer device). On the other hand, the 2-1th data may include data that has already been compressed once in a higher layer device (e.g., an application layer device). Since the data is data that has already been compressed once, a compression rate is not improved even if the UDC compression procedure is applied, so that the UDC compression procedure may not be applied (whether or not to apply the UDC compression procedure to data may be configured via an RRC message). In addition, the 2-1th data may include SDAP control data (SDAP control PDU or end marker) received from a higher layer device (e.g., SDAP layer device), may not allow to apply the UDC compression procedure to the SDAP header or the SDAP control so as to reduce the complexity of terminal implementation, and may allow a DU of a base station, which is implemented by a central unit-distributed unit split (CU-DU) structure, to easily read information of the SDAP header or the SDAP control data.

The above data processing procedure of the transmission end PDCP layer device may include the following. The transmission end PDCP layer device may apply the UDC procedure to the 1-1th data (e.g., PDCP SDU, higher layer device data, or application layer device data) received from a higher layer device, in the data received from the higher layer device, may indicate, using the indicator of the UDC header, that the UDC compression procedure has been applied, may apply the ciphering procedure to the UDC header and compressed data (if the ciphering procedure has been configured), and may generate and concatenate a PDCP header so as to process the same into 1-2th data (e.g., PDCP data PDU or PDCP PDU) (if the integrity protection procedure has been configured, the transmission end PDCP layer device may perform the integrity protection procedure for the PDCP header, the SDAP header, the UDC header, or compressed data (for the PDCP header, the SDAP header, the UDC header to which the ciphering procedure has been applied, or compressed data to which the ciphering procedure has been applied, if the ciphering procedure has been applied), and may generate the 1-2th data by concatenating a 4-byte MAC-I field after the compressed data). However, if an SDAP header is configured for a higher SDAP layer device of the PDCP layer device, the ciphering procedure or the UDC compression method is not applied to the SDAP header concatenated to the data. To facilitate the above ciphering procedure, the SDAP header may be concatenated or located after the PDCP header and before the UDC header.

The data processing procedure of the transmission end PDCP layer device may include the following. The transmission end PDCP layer device may not apply the UDC procedure to 2-1th data (e.g., PDCP SDU, higher layer device data, application layer device data, or SDAP control data (DSAP control PDU)) received from a higher layer device, may indicate, using the indicator of the UDC header, that the UDC compression procedure has not been applied, may apply the ciphering procedure to the UDC header and the 2-1th d data (if the ciphering procedure has been configured), and may generate a PDCP header and process the same into 2-2th data (e.g., PDCP data PDU or PDCP PDU). If the integrity protection procedure has been configured, the transmission end PDCP layer device may perform the integrity protection procedure for the PDCP header, the SDAP header, the UDC header, or the 2-1th data (for the PDCP header, the SDAP header, the UDC header to which the ciphering procedure has been applied, or the 2-1th data to which the ciphering procedure has been applied, if the ciphering procedure has been applied), and may generate the 2-2th data by concatenating a 4-byte MAC-I field after the compressed data.

In the above, the 2-1th data may include application layer device data, application layer data to which a compression function has been applied, SDAP control data (SDAP control PDU) of the SDAP layer device, or PDCP control data (PDCP control PDU) generated in the PDCP layer device. If the SDAP header of the SDAP layer device or the SDAP control data (SDAP control PDU) is configured, the ciphering procedure or the UDC compression method is not applied to the SDAP header concatenated to the data. A terminal stores data processed as described above (e.g., PDCP data PDU, PDCP PDU, or, e.g., 1-2th data or 2-2th data) so as to transmit the same when an uplink transmission resource is received. If the PDCP layer device of the transmission end (e.g., the terminal) receives PDCP control data (feedback indicating a UDC checksum failure) indicating a checksum failure, a UDC decompression failure, or an error from a reception end PDCP layer device, the transmission PDCP layer device may perform one of the following methods or an application method based on the following methods, in order to efficiently process the data which is pre-generated, stored, or preprocessed (e.g., PDCP data PDU, PDCP PDU, or 1-2th data or 2-2th data):

First method: If the UDC compression or decompression procedure is configured in the transmission end PDCP layer device, and the transmission end PDCP layer device receives, from the reception end PDCP layer device, PDCP control data (PDCP control PDU) indicating that a checksum failure has occurred, the transmission end PDCP layer device may initialize the transmission UDC buffer for user data compression (UDC compression). Alternatively, if the UDC compression or decompression procedure is configured in the PDCP layer device, and the transmission end PDCP layer device receives, from the reception end PDCP layer device, PDCP control data (PDCP control PDU) indicating that a checksum failure has occurred, the transmission end PDCP layer device may discard data (e.g., PDCP PDU, PDCP data PDU, 1-2th data, or 2-2th data) which is pre-generated, stored, or pre-processed or for which a PDCP discard timer has not yet expired. Alternatively, if the data (e.g., PDCP PDU, PDCP data PDU, 1-2th data, or 2-2th data) is delivered to lower layer devices, the transmission PDCP layer device may transmit a data discard indicator for the data (e.g., PDCP PDU, PDCP data PDU, 1-2th data, or 2-2th data) to a lower layer device (e.g., an RLC layer device) so as to cause the data to be discarded.

Alternatively, when transmitting the discard indicator to a lower layer device (e.g., an RLC layer device), the transmission end PDCP layer device may transmit the discard indicator only for PDCP user data (PDCP data PDU) and may not transmit a discard indicator for PDCP control data.

As another alternative, the transmission end PDCP layer device may apply, based on the transmission UDC buffer initialized in ascending order of the PDCP SNs or COUNT values, the UDC compression method to data (e.g., PDCP PDU, PDCP data PDU, 1-2th data, or 2-2th data) which has been discarded but not yet been transmitted in the above procedure, data which has not yet been transmitted to a lower layer device, data for which a successful delivery has not been identified from a lower layer device, and data to be newly transmitted, may regenerate the 1-2th data, may configure, in the PDCP header, the PDCP sequence number (or new PDC sequence number) which is mapped to the 1-1th data.

Alternatively, the transmission end PDCP layer device may perform PDCP data processing on the 2-1th data in ascending order of the PDCP SNs or COUNT values so as to regenerate the 2-2th data, and may configure, in the PDCP header, the PDCP sequence number (or new PDC sequence number) which is mapped to the 2-1th data so as to prevent a PDCP sequence number gap from being generated or minimize a PDCP sequence number gap. The PDCP discard timer corresponding to the 1-1th data or the 2-1th data in the above may be driven as it is without being resumed or initialized.

As a further alterative of the first method, the transmission end PDCP layer device may apply, based on the initialized transmission UDC buffer, the UDC compression method to data (e.g., PDCP PDU, PDCP data PDU, 1-2th data, or 2-2th data) which has been discarded but not yet been transmitted, data having a lowest PDCP sequence number (or COUNT value) among data which has not yet been transmitted to a lower layer device, or successive data (or including data to be newly transmitted) in ascending order of PDCP sequence numbers or COUNT values starting from first data (or data having a smallest COUNT value, e.g., PDCP PDU, PDCP data PDU, 1-2th data, or 2-2th data) for which a successful delivery has not been identified from a lower layer device, may regenerate the 1-2th data, and may configure, in the PDCP header, the PDCP sequence number (or new PDC sequence number) which is mapped to the 1-1th data, so as to perform data transmission (e.g., in a case where a successful delivery for COUNT value 3, 5, or 7 has not been identified from a lower layer device (e.g., in a case where a successful delivery has not been identified from an RLC state report of the RLC layer device), the transmission PDCP layer device may apply, based on the initialized transmission UDC buffer, a new UDC procedure to successive data in ascending order, such as 3, 4, 5, 6, 7, 8, and 9). In addition, the transmission end PDCP layer device may regenerate the 2-2th data by performing the PDCP data processing procedure on the 2-1th data in ascending order of the PDCP SNs or COUNT values for the 2-1th data, and may configure, in the PDCP header, the PDCP sequence number (or new PDC sequence number) which is mapped to the 2-1th data, so as to prevent a PDCP sequence number gap from being generated or minimize a PDCP sequence number gap. In another method, since no UDC procedure has been applied to the 2-1th data, data transmission may be continuously performed without discard. The PDCP discard timer corresponding to the 1-1th data or the 2-1th data in the above may be driven as it is, without being resumed or initialized.

Second method: If the UDC compression or decompression procedure is configured in the transmission end PDCP layer device, and the transmission end PDCP layer device receives, from the reception end PDCP layer device, PDCP control data (PDCP control PDU) indicating that a checksum failure has occurred, the transmission end PDCP layer device may initialize the transmission UDC buffer for user data compression (UDC compression).

Alternatively, if the UDC compression or decompression procedure is configured in the PDCP layer device, and the transmission end PDCP layer device receives, from the reception end PDCP layer device, PDCP control data (PDCP control PDU) indicating that a checksum failure has occurred, the transmission end PDCP layer device may discard only the 1-2th data (or PDCP data PDU), to which the UDC compression procedure has been applied, among data which is pre-generated, stored, pre-processed, or for which the PDCP discard timer has not yet expired, or if the 1-2th data (e.g., PDCP PDU or PDCP data PDU) to which the UDC compression procedure has been applied is delivered to lower layer devices, the transmission end PDCP layer device may transmit, to a lower layer device (e.g., an RLC layer device), a data discard indicator for the 1-2th data (e.g., PDCP PDU or PDCP data PDU) to which the UDC compression procedure has been applied, so as to enable the low layer device to discard the 1-2th data (e.g., PDCP PDU or PDCP data PDU) to which the UDC compression procedure has been applied.

Alternatively, in the above, when transmitting the discard indicator to a lower layer device (e.g., an RLC layer device), the transmission end PDCP layer device may transmit the discard indicator only for PDCP user data (PDCP data PDU) and may not transmit a discard indicator for PDCP control data.

As another alternative, the transmission end PDCP layer device may apply, based on the transmission UDC buffer initialized in ascending order of the PDCP SNs or COUNT values, the UDC compression method to data (e.g., PDCP PDU, PDCP data PDU, or 1-2th data) which has been discarded but not yet been transmitted in the above procedure, data which has not yet been transmitted to a lower layer device, data for which a successful delivery has not been identified from a lower layer device, and data to be newly transmitted, may regenerate the 1-2th data, and may configure, in the PDCP header, the PDCP sequence number (or new PDC sequence number) which is mapped to the 1-1th data, so as to prevent a PDCP sequence number gap from being generated or minimize a PDCP sequence number gap. The PDCP discard timer corresponding to the 1-1th data in the above may be driven as it is, without being resumed or initialized.

As a further alternative of the second method, the transmission end PDCP layer device may apply, based on the initialized transmission UDC buffer, the UDC compression method to data (e.g., PDCP PDU, PDCP data PDU, or 1-2th data) which has been discarded but not yet been transmitted, data having a lowest PDCP sequence number (or COUNT value) among data which has not yet been transmitted to a lower layer device, or successive data (or including data to be newly transmitted) in ascending order of PDCP sequence numbers or COUNT values starting from first data (or data having a smallest COUNT value, e.g., PDCP PDU, PDCP data PDU, or 1-2th data) for which a successful delivery has not been identified from a lower layer device, may regenerate the 1-2th data, and may configure, in the PDCP header, the PDCP sequence number (or new PDC sequence number) which is mapped to the 1-1th data, so as to perform data transmission (e.g., in a case where a successful delivery for COUNT value 3, 5, or 7 has not been identified from a lower layer device (e.g., in a case where a successful delivery has not been identified from an RLC state report of the RLC layer device), the transmission PDCP layer device may apply, based on the initialized transmission UDC buffer, a new UDC procedure to successive data in ascending order, such as 3, 4, 5, 6, 7, 8 and 9). Since no UDC procedure has been applied to the 2-1th data, data transmission may be continuously performed without discard. The PDCP discard timer corresponding to the 1-1th data or the 2-1th data may be driven as it is, without being resumed or initialized.

Third method: If the UDC compression or decompression procedure is configured in the transmission end PDCP layer device, and the transmission end PDCP layer device receives, from the reception end PDCP layer device, PDCP control data (PDCP control PDU) indicating that a checksum failure has occurred, the transmission end PDCP layer device may initialize the transmission UDC buffer for user data compression (UDC compression), or may perform an RLC layer device re-establishment procedure (RLC re-establishment) for an RLC layer device (or multiple RLC layer devices) connected to the transmission end PDCP layer device. The RLC layer device may indicate RLC layer devices operating in the AM mode.

In another method, the RLC layer device may be extended to RLC layer devices operating in the UM mode so as to be applied. In the RLC layer device re-establishment procedure, in a case of an LTE (E-UTRA) RLC layer device, all transmission or reception window variables (state variables) of RLC layer devices may be initialized to 0, or if a reordering timer is running, the timer may be paused or initialized, and complete data (complete RLC PDU), which has been fully reassembled, among stored data may be delivered to a higher layer device. In the RLC layer device re-establishment procedure, in a case of an NR RLC layer device, all transmission or reception window variables (state variables) of RLC layer devices may be initialized to 0, or if a reordering timer is running, the timer may be paused or initialized, and data (segment), which has not been fully reassembled, among stored data may be discarded. The RLC layer device re-establishment procedure may be performed also on an RLC layer device (or multiple RLC layer devices) connected to the PDCP layer device of the reception end having transmitted the PDCP control data, and the RLC layer device re-establishment procedure may be performed when an FR bit is configured to 1 and data indicating UDC buffer initialization is received or when the PDCP control data is transmitted. The transmission end PDCP layer device may apply, based on the transmission UDC buffer initialized in ascending order of the PDCP SNs or COUNT values, the UDC compression method to data (e.g., PDCP PDU, PDCP data PDU, 1-2th data, or 2-2th data) which has been discarded but not yet been transmitted, data which has not yet been transmitted to a lower layer device, data for which a successful delivery has not been identified from a lower layer device, and data to be newly transmitted, may regenerate the 1-2th data, may configure, in the PDCP header, the PDCP sequence number (or new PDC sequence number) which is mapped to the 1-1th data.

Alternatively, the transmission end PDCP layer device may perform PDCP data processing on the 2-1th data in ascending order of the PDCP SNs or COUNT values so as to regenerate the 2-2th data, and may configure, in the PDCP header, the PDCP sequence number (or new PDC sequence number) which is mapped to the 2-1th data so as to prevent a PDCP sequence number gap from being generated or minimize a PDCP sequence number gap. The PDCP discard timer corresponding to the 1-1th data or the 2-1th data in the above may be driven as it is, without being resumed or initialized.

As a further alternative of the third method, the transmission end PDCP layer device may apply, based on the initialized transmission UDC buffer, the UDC compression method to data (e.g., PDCP PDU, PDCP data PDU, 1-2th data, or 2-2th data) which has been discarded but not yet been transmitted, data having a lowest PDCP sequence number (or COUNT value) among data which has not yet been transmitted to a lower layer device, or successive data (or including data to be newly transmitted) in ascending order of PDCP sequence numbers or COUNT values starting from first data (or data having a smallest COUNT value, e.g., PDCP PDU, PDCP data PDU, 1-2th data, or 2-2th data) for which a successful delivery has not been identified from a lower layer device, may regenerate the 1-2th data, and may configure, in the PDCP header, the PDCP sequence number (or new PDC sequence number) which is mapped to the 1-1th data, so as to perform data transmission (e.g., in a case where a successful delivery for COUNT value 3, 5, or 7 has not been identified from a lower layer device (e.g., in a case where a successful delivery has not been identified from an RLC state report of the RLC layer device), the transmission PDCP layer device may apply, based on the initialized transmission UDC buffer, a new UDC procedure to successive data in ascending order, such as 3, 4, 5, 6, 7, 8, and 9). In addition, the transmission end PDCP layer device may regenerate the 2-2th data by performing the PDCP data processing procedure on the 2-1th data in ascending order of the PDCP SNs or COUNT values, and may configure, in the PDCP header, the PDCP sequence number (or new PDC sequence number) which is mapped to the 2-1th data, so as to prevent a PDCP sequence number gap from being generated or minimize a PDCP sequence number gap.

In another method, since no UDC procedure has been applied to the 2-1th data, data transmission may be continuously performed without discard. The PDCP discard timer corresponding to the 1-1th data or the 2-1th data may be driven as it is without being resumed or initialized.

As another method, the transmission PDCP layer device may perform the PDCP re-establishment procedure or the PDCP data recovery procedure.

The first method or the second method described above may be applied to an LTE PDCP layer device or an NR PDCP layer device.

A lower layer device having received a discard indicator according to the first method or the second method may operate as follows. The lower layer device may be multiple AM RLC layer devices operating in the AM, and each AM RLC layer device having received the discard indicator may perform procedures proposed below.

As another method, by extending the disclosed procedure, the lower layer device may be multiple UM RLC layer devices operating in an unacknowledged (UM) mode, and each UM RLC layer device having received the discard indicator may perform procedures, as disclosed below.

In the above, an indicator indicating to discard data (e.g., PDCP user data) has been received from an LTE (or E-UTRA) PDCP layer device or an NR PDCP layer device, and if the RLC layer device having received the discard indicator is an LTE RLC layer device, With respect to user data (PDCP PDU, PDCP Data PDU, or RLC SDU) received from a higher layer device (PDCP layer device), if a part of the user data has not yet been mapped to RLC user data (RLC data PDU), or is not generated as RLC user data, the LTE RLC layer device discards the user data (when indicated from upper layer (i.e., PDCP) to discard a particular RLC SDU, the transmitting side of an AM RLC entity or the transmitting UM RLC entity shall discard the indicated RLC SDU if no segment of the RLC SDU has been mapped to a RLC data PDU yet). Accordingly, if a part of the user data is already mapped to the RLC user data (RLC data PDU) or is generated as RLC user data, the LTE RLC layer device may perform data transmission without discarding the user data. For example, if the data indicated to be discarded by the discard indicator in the above has already been divided and a part of the data has been transmitted as a segment, the data may not be discarded, or if the data indicated to be discarded by the discard indicator in the above has already been transmitted (or corresponds to data to be retransmitted) or is generated as data (e.g., RLC PDU, UMD PDU, or AMD PDU) of the RLC layer device, the data may not be discarded.

In the above, an indicator indicating to discard data (e.g., PDCP user data) has been received from an LTE (or E-UTRA) PDCP layer device or an NR PDCP layer device, and the RLC layer device having received the discard indicator is an NR RLC layer device.

With respect to user data (PDCP PDU, PDCP Data PDU, or RLC SDU) received from a higher layer device (PDCP layer device), if the user data or a part of the user data has never been delivered or transmitted to a lower layer device, the NR RLC layer device discards the user data. When indicated from an upper layer (i.e., PDCP) to discard a particular RLC SDU, the transmitting side of an AM RLC entity or the transmitting UM RLC entity shall discard the indicated RLC SDU, if neither the RLC SDU nor a segment thereof has been submitted to the lower layers.

Accordingly, if the user data or a part of the user data has been delivered or transmitted to a lower layer device, the NR RLC layer device may perform data transmission without discarding the user data. Therefore, unlike the LTE RLC layer device, even if the user data is generated as RLC user data, the NR RLC layer device may discard the user data if the user data is not delivered to a lower layer device, so that the NR RLC layer device may discard more data and prevent unnecessary data transmission more efficiently. For example, if the data indicated to be discarded by the discard indicator in the above has already been divided and a part of the data has been transmitted as a segment, the data may not be discarded, or if the data indicated to be discarded by the discard indicator in the above has already been transmitted (or corresponds to data to be retransmitted), the data may not be discarded. For example, even if the data indicated to be discarded by the discard indicator is generated as data (e.g., RLC PDU, UMD PDU, or AMD PDU) of the RLC layer device, if the data has not been transmitted to a lower layer device (MAC layer device), the data may be discarded.

When the first method or the second method as disclosed above is applied in the transmission PDCP layer device (e.g., a terminal, a network, or a base station), a PDCP sequence number gap or difference is generated so that a transmission delay due to a reordering timer may occur in the PDCP layer device (e.g., a network, a base station, or a terminal) of the reception end. To prevent a transmission delay due to the reordering timer of the PDCP layer device as described above, the reception PDCP layer device may apply one of the following methods or an application method when a UDC decompression error or a checksum failure occurs, or when the PDCP control data is transmitted or the PDCP re-establishment procedure is performed.

Fourth method: In the fourth method, if the reception end PDCP layer device is an NR PDCP layer device, if a checksum failure related to the UDC compression method occurs, or if PDCP control data (PDCP control PDU) has been transmitted due to the checksum failure, when the reception end PDCP layer device receives data corresponding to a PDCP sequence number or a COUNT value greater than a PDCP sequence number or a COUNT value of the data, for which the checksum failure has occurred, with respect to data received thereafter, the reception end PDCP layer device may identify the FR bit of the UDC header and may continue to store received data in the buffer until reception of data indicating that the FR bit has been configured to 1. Thus, the transmission UDC buffer has been initialized. When the reception end PDCP layer device receives data corresponding to a PDCP sequence number or a COUNT value smaller than the PDCP sequence number or COUNT value of the data for which the checksum failure has occurred, the reception end PDCP layer device may identify the indicator of the UDC header and may discard data, to which the UDC compression method has been applied, because the data may be UDC-decompressed.

As another method, the reception end PDCP layer device may identify the UDC header of the stored data, may first process data to which the UDC compression method is not applied, and may deliver the data to a higher layer. If indicating data which indicates that the FR bit of the UDC header of the received data is configured to 1. Thus, the transmission UDC buffer is initialized, the reception end PDCP layer device may pause and initialize the reordering timer if the reordering timer is running.

Alternatively, with respect to data corresponding to a PDCP sequence number or a COUNT value equal to or greater than the PDCP sequence number or COUNT value of data, for which the FR bit of the UDC header is configured to 1, from among the stored data, the reception end PDCP layer device may successively process the data in sequence without a gap in PDCP sequence numbers or COUNT values (e.g., by applying or not applying the UDC decompression method, based on the indicator of the UDC header), and may deliver the processed data to a higher layer device. With respect to data corresponding to a PDCP sequence number or a COUNT value equal to or greater than the PDCP sequence number or COUNT value of data for which the FR bit of the UDC header is configured to 1, when successively processing the data in sequence without a gap in PDCP sequence numbers or COUNT values, if a gap in PDCP sequence numbers or COUNT values is identified, the reception end PDCP layer device may process the data as described above, and may update a variable for reordering with a current reordering variable value or with a PDCP sequence number or a COUNT value of first data which has not been delivered to a higher layer device and has a PDCP sequence number or a COUNT value greater than that of the data for which the FR bit of the UDC header is configured to 1. If the gap in the PDCP sequence numbers or COUNT values is identified, e.g., if a PDCP sequence number or a COUNT value expected to be received next is greater than the reordering variable value, the reordering timer may be started or resumed.

Fifth method: In the fifth method, if the reception end PDCP layer device is an LTE PDCP layer device, if a checksum failure related to the UDC compression method occurs, or if PDCP control data (PDCP control PDU) has been transmitted due to the checksum failure, when the reception end PDCP layer device receives data corresponding to a PDCP sequence number or a COUNT value greater than a PDCP sequence number, for which the checksum failure has occurred, with respect to data received thereafter, the reception end PDCP layer device may identify the FR bit of the UDC header and may continue to discard received data until reception of data indicating that the FR bit has been configured to 1. Thus, the transmission UDC buffer has been initialized. This is because the LTE RLC layer device arranges and transmits the data in order.

As another method, the reception end PDCP layer device may identify the UDC header of the stored data, may first process data to which the UDC compression method is not applied, and may deliver the data to a higher layer. If indicating data which indicates that the FR bit of the UDC header of the received data is configured to 1 and thus the transmission UDC buffer is initialized, the reception end PDCP layer device may pause and initialize the reordering timer if the reordering timer is running.

Alternatively, with respect to data corresponding to a PDCP sequence number or a COUNT value equal to or greater than the PDCP sequence number or COUNT value of the data, for which the FR bit of the UDC header is configured to 1, from among the stored data and data received after the pause and initialization, the reception end PDCP layer device may successively process the data in sequence without a gap in PDCP sequence numbers or COUNT values (e.g., by applying or not applying the UDC decompression method, based on the indicator of the UDC header), and may deliver the processed data to a higher layer device. With respect to data corresponding to a PDCP sequence number or a COUNT value equal to or greater than the PDCP sequence number or COUNT value of data for which the FR bit of the UDC header is configured to 1, when successively processing the data in sequence without a gap in PDCP sequence numbers or COUNT values, if a gap in PDCP sequence numbers or COUNT values is identified, the reception end PDCP layer device may process the data as described above, and may update a variable for reordering with a current reordering variable value or with a PDCP sequence number or a COUNT value of first data which has not been delivered to a higher layer device or of data which has been delivered lastly to a higher layer and has a PDCP sequence number or a COUNT value greater than that of the data for which the FR bit of the UDC header is configured to 1. If the gap in the PDCP sequence numbers or COUNT values is identified, e.g., if a PDCP sequence number or a COUNT value expected to be received next is greater than the reordering variable value, the reordering timer may be started or resumed.

In the above, initialization of the UDC buffer may indicate initialization of all values of the UDC buffer to 0. As another method, when a predefined dictionary is configured in advance via an RRC message, the initialization of the UDC buffer may indicate inputting and initializing the predefined dictionary to values of the UDC buffer. A UDC compression procedure may be newly applied using the initialized transmission UDC buffer, each UDC header may be generated and configured, and then data transmission may be performed by applying a ciphering or integrity protection procedure. In the above, an indication that the transmission UDC buffer of the transmission PDCP layer device has been initialized may be provided using a 1-bit indicator to the UDC header of the first data (PDCP PDU) for which data processing is performed by initializing the transmission UDC buffer and applying the UDC compression procedure for the first time, or an indication to initialize the reception UDC buffer of the reception PDCP layer device may be provided to the UDC header of the first data. This is because, since the reception PDCP layer device is unable to identify data for which the transmission UDC buffer is initialized and UDC compression is newly performed, the transmission PDCP layer device may provide an indication using the 1-bit indicator of the UDC buffer, and the reception PDCP layer device may identify the 1-bit indicator, initialize the reception UDC buffer, and perform the UDC decompression procedure for the data first by using the initialized received UDC buffer. Therefore, if the 1-bit indicator in the UDC header of the received data (e.g., PDCP PDU) indicates to initialize the reception UDC buffer, the reception PDCP layer device may know that the transmission UDC buffer has already been initialized and that UDC compression has been newly applied to the data. Accordingly, the reception PDCP layer device may initialize the reception UDC buffer and may apply the UDC decompression procedure for the data first by using the initialized reception UDC buffer.

In the UDC compression method for performing compression on the entire data (e.g., PDCP SDU) received from the higher layer device, as described above, if the higher layer device is an Ethernet protocol or if the higher layer device is an SDAP layer device and the higher layer device of the SDAP layer device is an Ethernet protocol, also disclosed is a method of applying an EHC method to only the header part of the higher layer device corresponding to the Ethernet header with respect to the data (e.g., PDCP SDU) received by the PDCP layer device from the higher layer device.

That is, even if the UDC compression method for performing compression on the entire data (e.g., PDCP SDU) received from the higher layer device, as described above, and if the higher layer device is a TCP or IP protocol or if the higher layer device is an SDAP layer device and the higher layer device of the SDAP layer device is the TCP or IP protocol, also disclosed is a method of applying an ROHC header compression method to only the header part of the higher layer device corresponding to the TCP or IP header with respect to the data (e.g., PDCP SDU) received by the PDCP layer device from the higher layer device.

If the base station configures the Ethernet header via the compression method (or ROHC header compression method) and the UDC compression method at the same time via an RRC message, data processing burden and complexity are increased while a data compression rate is not significantly improved. Therefore, it may be restricted that the UDC compression method and the Ethernet header compression method (or the ROHC header compression method) are not configured at the same time. That is, the Ethernet header compression method (or the ROHC header compression method) may be configured for each uplink or downlink of the PDCP layer device, and may be configured when the UDC compression method is not configured. The UDC compression method may also be configured for each uplink or downlink of the PDCP layer device, and may be configured when the Ethernet header compression method (or the ROHC header compression method) is not configured. However, the Ethernet header compression method and the ROHC header compression method may be configured at the same time via the RRC message, so that the header compression procedure may be independently performed for each of an Ethernet header or a TCP/IP header, to greatly improve a compression rate. Since the Ethernet header compression method is a feedback-based method and cannot be applied in a one-way or uni-directional link (e.g., a bearer which applies an RLC UM layer device and is capable of transmitting data only in one direction), the Ethernet header compression method may be configured only in a bi-directional link, via the RRC message. If the UDC compression method is configured for downlink or uplink via the RRC message, it may be restricted that the out-of-sequence delivery function cannot be configured in an LTE RLC layer device connected to the LTE or NR PDCP layer device for which the UDC compression method is configured. The UDC compression method or the UDC decompression method disclosed herein may also be extended to the RLC UM mode so as to be configured for uplink or downlink.

Provided herein is an embodiment of efficiently performing a user data compression method when an SDAP layer device is configured or an SDAP header is configured via an RRC message. In the embodiment, a user data compression method is not applied to an SDAP header, the SDAP header is not ciphered, and a UDC header is ciphered. The UDC header is attached after the SDAP header, the UDC header is attached immediately before a compressed UDC block, and the SDAP header is attached before the UDC header. Accordingly, QoS information of the SDAP header may be utilized without requiring a procedure of deciphering information of the SDAP header by a transmission end or a reception end. For example, a base station may use the QoS information for scheduling and, in a case of implementation of a terminal, there is no need to generate an SDAP header at every time that higher layer data is received. A hardware accelerator may perform a UDC procedure, generate the UDC and attach immediately and perform ciphering, and may attach an SDAP header later, so as to facilitate terminal implementation. In addition, a UDC header may be ciphered to reinforce security. By changing the location of the SDAP header and the location of the UDC header in the above embodiment, it is possible to reduce unnecessary procedures of processing after excluding the SDAP header or processing after removing the SDAP header and then reattaching the SDAP header when performing the user data compression procedure, and one unified procedure may be performed for the UDC header and UDC data block.

Figure 10:
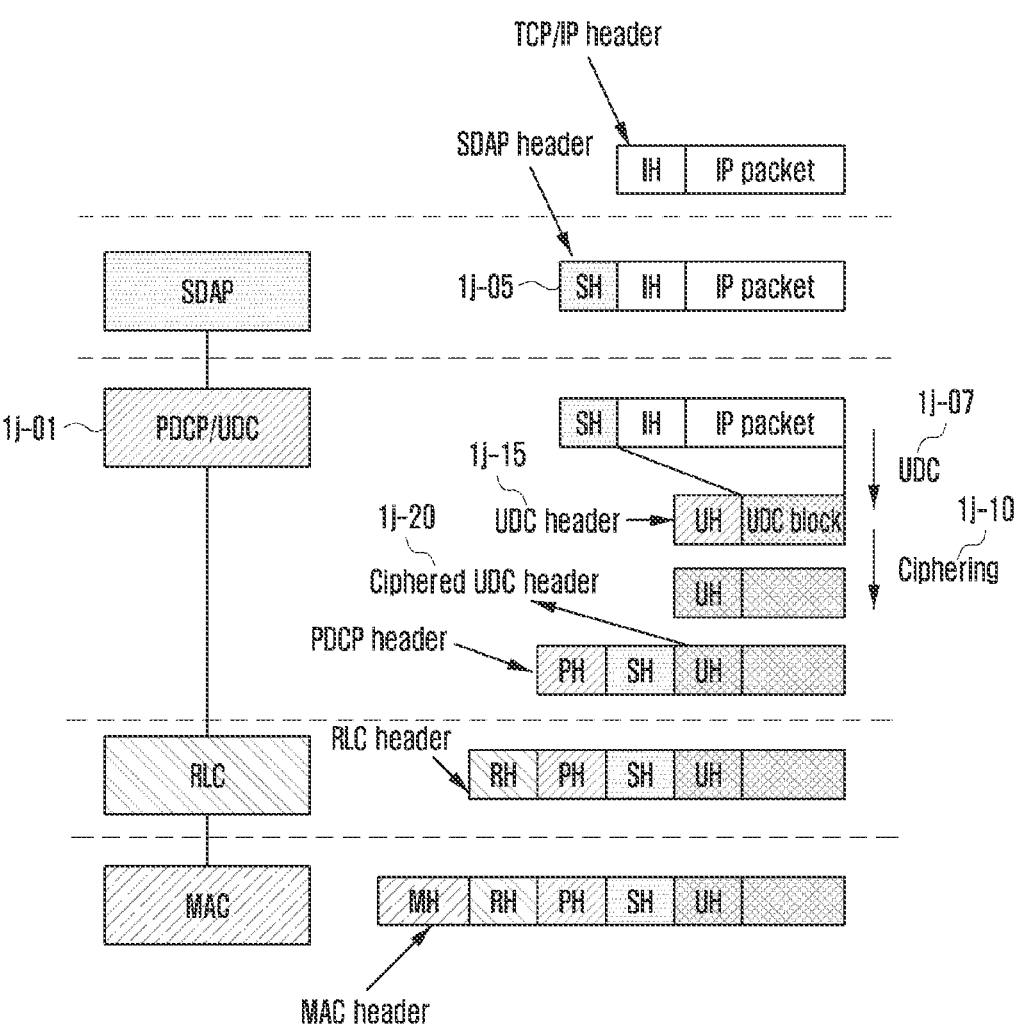
FIG. 10 illustrates a method of performing UDC when a service data adaption protocol (SDAP) layer device is configured or an SDAP header is configured via a radio resource control (RRC) message according to an embodiment.

FIG. 10 illustrates a method of performing UDC when an SDAP layer device is configured or an SDAP header is configured via an RRC message according to an embodiment.

In FIG. 10, if an SDAP layer device is configured to be used or an SDAP header is configured to be used via an RRC message, as described above and shown in FIG. 5, and UDC is configured, if data is received from a higher layer, the SDAP layer device may generate and configure an SDAP header as in step 1*j*-05, and may deliver the same to a PDCP layer device. The PDCP layer device may perform a user data compression procedure, in step 1*j*-07, on a data part remaining after excluding the SDAP header from the PDCP SDU (SDAP header and IP packet, 1*j*-06) received from a higher SDAP layer device. Further, the PDCP layer device may calculate a checksum field and configure whether UDC is applied, so as to generate a UDC header and attach the UDC header immediately before the compressed UDC data block (after the SDAP header), in step 1*j*-10. If integrity protection is configured, the PDCP layer device may apply integrity protection to the SDAP header, UDC header, compressed UDC block, and PDCP header before performing a ciphering procedure, and then may cipher the UDC header and the compressed UDC block. The PDCP layer device may configure data, generate and configure a PDCP header in step 1*j*-20, concatenate the SDAP header first, concatenate the PDCP header, and then deliver the headers and the data to a lower layer to proceed with data processing in an RLC layer device and a MAC layer device.

Figure 11:
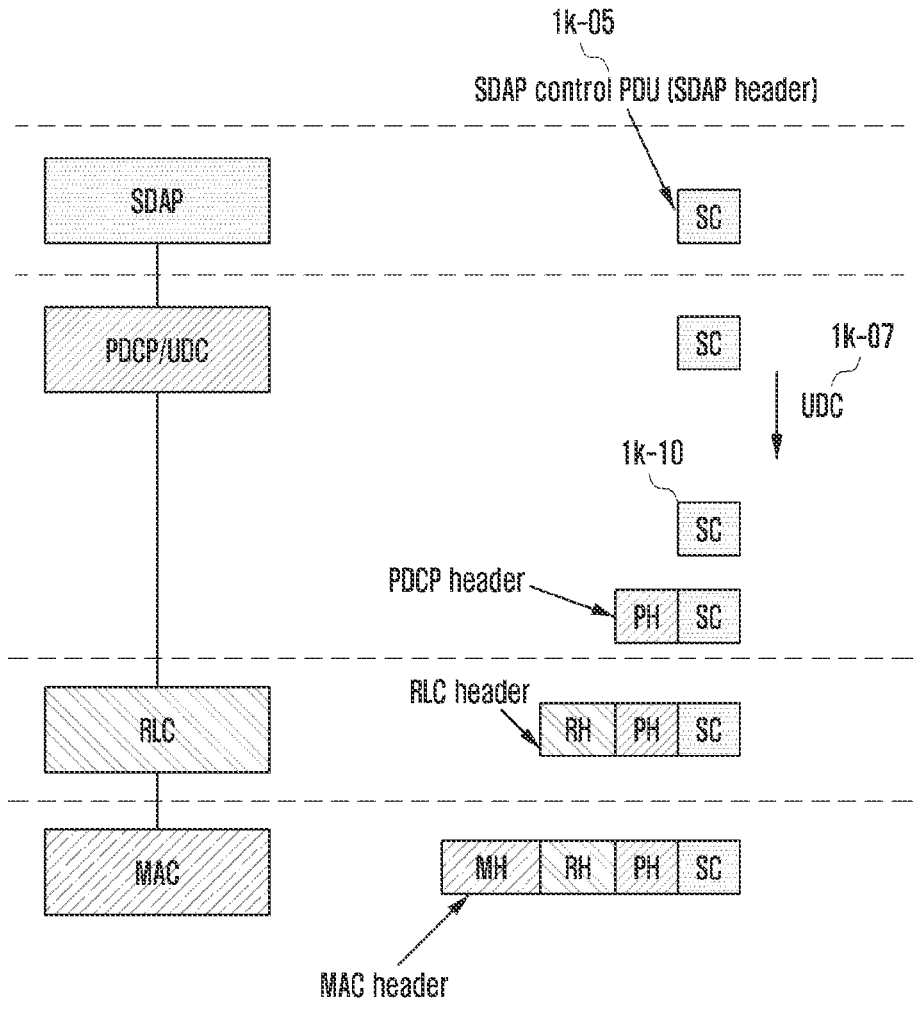
FIG. 11 illustrates a method of performing UDC and processing SDAP control data when an SDAP layer device is configured or an SDAP header is configured via an RRC message according to an embodiment.

FIG. 11 illustrates a method of performing UDC and processing SDAP control data when an SDAP layer device is configured or an SDAP header is configured via an RRC message according to an embodiment.

In FIG. 11, if an SDAP layer device is configured to be used or an SDAP header is configured to be used via an RRC message as described above and shown in FIG. 5, and UDC is configured, if SDAP control data in step 1k-05 is received from a higher layer, the SDAP layer device may configure a 1-bit D/C field of the SDAP header to be 1 and indicate that SDAP user data (SDAP data PDU) is SDAP user data or SDAP header, and may configure the 1-bit D/C field of the SDAP header to be 0 and indicate that SDAP control data (SDAP control PDU) is SDAP control data. The transmission PDCP layer device may not perform a user data compression procedure on the SDAP control data received from the higher SDAP layer device, in step 1k-07. Further, a UDC header for the SDAP control data is not generated in step 1k-10. In addition, if integrity protection is configured, the transmission PDCP layer device may apply integrity protection to the PDCP header and SDAP control data before performing a ciphering procedure, and then does not perform ciphering of the SDAP control data. In addition, the transmission PDCP layer device may configure and concatenate a PDCP header to the very front of the SDAP control data, and deliver the data to a lower layer device.

The 1-bit indicator of the PDCP header, the SDAP control data, or the 1-bit D/C field of the SDAP header disclosed herein provides a function to indicate the presence or absence of the UDC header, or, when the user compression procedure is not applied to the SDAP header and data received from the higher layer, the UDC header is omitted, and the 1-bit indicator of the PDCP header may indicate that the UDC header is not attached, so as to reduce the overhead.

Disclosed is an embodiment for operation of a PDCP layer device of a terminal or a base station that performs different data processing by distinguishing a case where the transmission or reception PDCP layer device receives an SDAP header and higher layer data from a higher layer device or a lower layer device, and a case where the transmission or reception PDCP layer device receives SDAP control data.

If an SDAP layer device is configured to be used or an SDAP header is configured to be used via an RRC message, as described above and shown in FIG. 5, and if UDC is configured, the following are to be considered:

If the data (e.g., PDCP SDU) received from the higher layer device (SDAP layer device) includes the SDAP header and higher layer data, or if the data is not SDAP control data, (when processing the data (PDCP SDU) received from the higher layer device, the transmission PDCP layer device may first identify the 1-bit D/C field of the SDAP header or SDAP control data and distinguish the same. In addition, the 1-bit indicator of the UDC header or the 1-bit indicator of the PDCP header may indicate whether an SDAP header is indicated or SDAP control data is indicated (or whether or not compressed). As another method, if the size of the received data exceeds 1 byte, it may be determined that the received data is not SDAP control data and the SDAP header and data are included. However, if the size of the received data is 1 byte, it may be determined that the received data is SDAP control data).

The transmission PDCP layer device performs the procedure described above and shown in FIG. 10. For example, the transmission PDCP layer device applies the UDC compression procedure except for the SDAP header, performs integrity protection if the integrity protection is configured, attaches the UDC header after the SDAP header, ciphers the UDC header and compressed data except for the SDAP header, concatenates the ciphered UDC header and compressed data to the very front of the PDCP header, and transmits the same to the lower layer device.

If the data (e.g., PDCP SDU) received from the higher layer device (SDAP layer device) does not include the SDAP header and higher layer data, or if the data is SDAP control data (when processing the data (PDCP SDU) received from the higher layer device, the transmission PDCP layer device may first identify the 1-bit D/C field of the SDAP header or SDAP control data and distinguish the same. In addition, the 1-bit indicator of the UDC header or the 1-bit indicator of the PDCP header may indicate whether an SDAP header is indicated or SDAP control data is indicated (or whether or not compressed). As another method, if the size of the received data exceeds 1 byte, it may be determined that the received data is not SDAP control data and the SDAP header and data are included. However, if the size of the received data is 1 byte, it may be determined that the received data is SDAP control data).

The transmission PDCP layer device performs the procedure described above and shown in FIG. 11. For example, the transmission PDCP layer device performs integrity protection if the integrity protection is configured in the SDAP control data, does not apply the UDC compression procedure or ciphering procedure, does not generate a UDC header, concatenates the PDCP header, and transmits the same to the lower layer device.

If the data (e.g., PDCP PDU) received from a lower layer device (RLC layer device) includes the SDAP header and higher layer data, or if the data is not SDAP control data, (when processing the data (PDCP PDU) received from the lower layer device, the reception PDCP layer device may first identify the 1-bit D/C field of the SDAP header or SDAP control data and distinguish the same. As another method, the 1-bit indicator of the UDC header or the 1-bit indicator of the PDCP header may be identified and distinguished. As another method, the reception PDCP layer device may perform data processing by identifying the size of data received from the lower layer. For example, if the size of the data except for the PDCP header of the received data is 1 byte, SDAP control data may be indicated, and if the data size exceeds 1 byte, SDAP user data (or SDAP header) may be indicated. In another method, SDAP control data may be indicated if the size of data except for the PDCP header is 2 bytes (1-byte UDC header and 1-byte SDAP control data) in the above, and SDAP user data (or SDAP header) may be indicated if the data size exceeds 2 bytes. In another method, if the size of the data received from the lower layer is equal to the sum of the size of the PDCP header, the size of the UDC header, and the size of the SDAP control data, the SDAP control data may be indicated, and if the data size exceeds the sum of the size of the PDCP header, the size of the UDC header, and the size of the SDAP control data in the above, the SDAP user data (or SDAP header) may be indicated. As another method, e.g., the reception PDCP layer device may identify the size of data received from the lower layer, if the size of the data except for the PDCP header is 1 byte, the reception PDCP layer device may indicate the SDAP control data, and if the data size exceeds 1 byte, the reception PDCP layer device may indicate the SDAP user data (or SDAP header). In another method, if the size of the data received from the lower layer is equal to the sum of the size of the PDCP header and the size of the SDAP control data, the SDAP control data may be indicated, and if the data size exceeds the sum of the size of the PDCP header and the size of the SDAP control data, SDAP user data (or SDAP header) may be indicated.

The reception PDCP layer device performs the procedure described above and shown in FIG. 10. For example, the reception PDCP layer device performs a deciphering procedure on the UDC header and data except for the SDAP header, performs integrity protection if the integrity protection is configured, performs the UDC decompression procedure if there is an indicator indicating that the UDC compression procedure has been applied to the UDC header, and delivers the same to a higher layer device.

If the data (e.g., PDCP PDU) received from a lower layer device (RLC layer device) does not include the SDAP header and higher layer data, or if the data is SDAP control data (when processing the data (PDCP PDU) received from the lower layer device, the reception PDCP layer device may first identify the 1-bit D/C field of the SDAP header or SDAP control data and distinguish the same. As another method, the 1-bit indicator of the UDC header or the 1-bit indicator of the PDCP header may be identified and distinguished. As another method, the reception PDCP layer device may perform data processing by identifying the size of data received from the lower layer. For example, if the size of the data except for the PDCP header of the received data is 1 byte, SDAP control data may be indicated, and if the data size exceeds 1 byte, SDAP user data (or SDAP header) may be indicated. In another method, SDAP control data may be indicated if the size of data except for the PDCP header is 2 bytes (1-byte UDC header and 1-byte SDAP control data) in the above, and SDAP user data (or SDAP header) may be indicated if the data size exceeds 2 bytes. In another method, if the size of the data received from the lower layer is equal to the sum of the size of the PDCP header, the size of the UDC header, and the size of the SDAP control data, the SDAP control data may be indicated, and if the data size exceeds sum of the size of the PDCP header, the size of the UDC header, and the size of the SDAP control data in the above, the SDAP user data (or SDAP header) may be indicated. As another method, e.g., when the above embodiment is applied, the reception PDCP layer device may identify the size of data received from the lower layer, if the size of the data except for the PDCP header is 1 byte, the reception PDCP layer device may indicate the SDAP control data, and if the data size exceeds 1 byte, the reception PDCP layer device may indicate the SDAP user data (or SDAP header). In another method, if the size of the data received from the lower layer is equal to the sum of the size of the PDCP header and the size of the SDAP control data, the SDAP control data may be indicated, and if the data size exceeds the sum of the size of the PDCP header and the size of the SDAP control data, SDAP user data (or SDAP header) may be indicated).

The reception PDCP layer device performs the procedure described above and shown in FIG. 11. For example, the reception PDCP layer device does not perform a deciphering procedure for the SDAP control data, performs integrity protection if the integrity protection is configured, does not perform the UDC decompression procedure because there is no UDC header and UDC compression is not applied to the SDAP control data, and delivers the same to the higher layer device.

Figure 12:
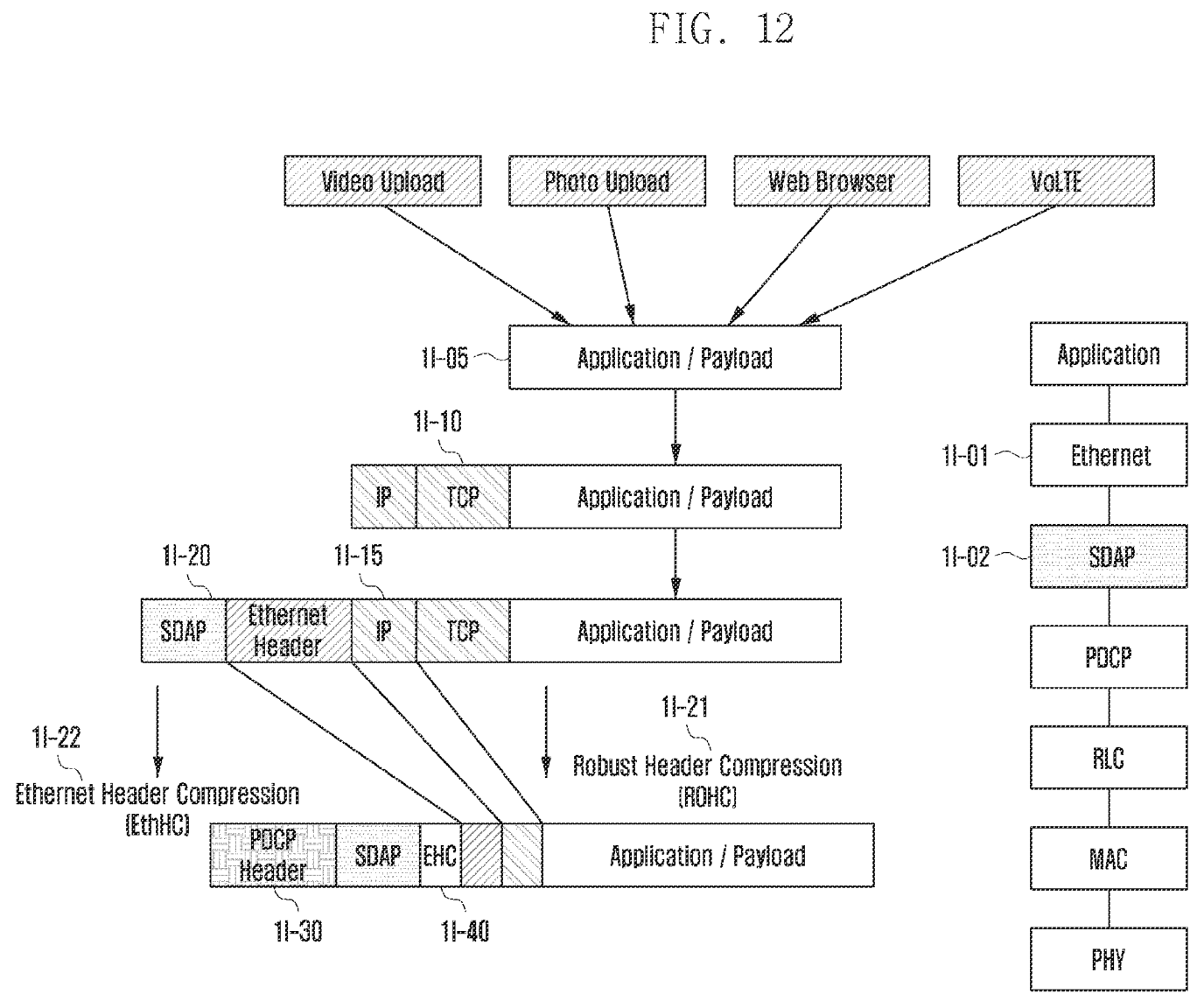

FIG. 12 illustrates an EthHC method when an SDAP header or a layer device is configured according to an embodiment.

In FIG. 12, higher layer data 1l-05 may be generated as data corresponding to services, such as video transmission, photo transmission, web search, and voice over LTE (VoLTE). Data generated by an application layer device may be processed via TCP/IP or UDP corresponding to a network data transport layer, or may be processed via the Ethernet protocol 1l-01 and may be processed by an SDAP layer device 1l-02, and the data may constitute respective headers 1l-10, 1l-15, and 1l-20 (a higher layer header, an Ethernet header, or an SDAP header) and may be delivered to a PDCP layer. When the PDCP layer receives data (PDCP SDU) from a higher layer, the following procedure may be performed.

If the header compression (ROHC) or Ethernet header compression procedure is configured to be used in the PDCP layer via RRC messages as described above and shown in FIG. 5, the TCP/IP header may be compressed with ROHC in step 1l-21, and the PDCP layer may perform the Ethernet header compression procedure for the Ethernet header 1l-20 except for the SDAP header, in step 1l-22 of FIG. 12. Further, the PDCP layer may configure a separate EHC header 1l-40, which includes a field for indicating whether to compress the Ethernet header, a field for indicating which field of the Ethernet header has been compressed (omitted) or not compressed (non-omitted), or a context identifier, and may configure the separate EHC header before the compressed header. If the integrity verification is configured, the PDCP layer may perform integrity protection for an SDAP header, a PDCP header, an EHC header 1l-40, compressed headers, and data. In addition, the PDCP layer may perform a ciphering procedure for compressed headers, data, and the EHC header except for the SDAP header, and may configure a PDCP PDU by configuring a PDCP header 1l-30.

A reception end may perform a deciphering procedure for compressed headers, data, and the EHC header except for the SDAP header in a reception PDCP layer device. In addition, if an integrity protection or verification procedure is configured, the reception end may perform integrity verification for the PDCP header, EHC header, compressed headers, and data. In the above, the PDCP layer device includes a header compressor/decompressor, determines whether to perform header compression on each data as configured via the RRC message, and uses the header compressor/decompressor. The transmission end compresses the Ethernet header or higher layer header (e.g., a TCP/IP header) by using the header compressor in the transmission PDCP layer device, and the reception end performs header decompression for the Ethernet header or higher layer header (e.g., a TCP/IP header) by using the header decompressor in the reception PDCP layer device. In the above, the ciphering procedure or the deciphering procedure may be applied to an EHC header excluding the PDCP header or SDAP header, an Ethernet header compressed by the Ethernet header compression method, a higher layer header compressed by the ROHC header compression method, or the remaining data. In addition, the integrity protection or verification procedure may be applied to the PDCP header, the SDAP header, the EHC header, the Ethernet header compressed by the Ethernet header compression method, a higher layer header compressed by the ROHC header compression method, or the remaining data.

The procedure described above regarding FIG. 12 may be applied to a case where a terminal performs downlink data header compression as well as uplink header compression. In addition, the description for uplink data may be applied to downlink data in the same manner.

A method of performing Ethernet header compression on the Ethernet header disclosed herein reduces the header size by indicating only information changed or to be changed and omitting fields indicating or having fixed information. Therefore, at first, information including the entire header information and configuration information for compression (e.g., a traffic (or service)-specific identifier (type) for the Ethernet protocol, a traffic (or service)-specific sequence number, information related to a compression rate, or an indicator indicating whether compression is performed) may be transmitted. In addition, fields (e.g., a transmission address field or a reception address field (MAC address), a preamble field, start of frame delimiter (SFD), frame checksum (FCS), Ethernet type field, Q-Tag field, etc.) corresponding to unchanged information in comparison with entire information transmitted at first or fixed information may be omitted or may not be transmitted, and the header may be configured including only fields corresponding to changed information or changeable information, so as to reduce the size of the header. Alternatively, header fields may be compressed when receiving feedback in response to successful reception of data having the entire header, or fields (e.g., a transmission address field or a reception address field (MAC address), a preamble field, SFD, FCS, Ethernet type field, Q-Tag field, etc.) corresponding to unchanged information in comparison with the entire information transmitted at first or fixed information may be omitted or may not be transmitted, and the header may be configured to only include fields corresponding to changed information or changeable information, so as to reduce the size of the header. As another method, since compressible fields and non-compressible fields are distinguished, and values of the compressible fields may be assumed to include the same values as the field values of the full header transmitted at first, only the compressible fields may be compressed (or omitted) so as to be transmitted, and non-compressible fields may always be transmitted without being compressed (or omitted). In addition, if there is even one field among the compressible fields having a value that has been changed from a field value of the previously transmitted full header, the full header may be transmitted again. In addition, each time the full header is received, the reception PDCP layer device may always transmit, to a transmission PDCP layer device, feedback indicating that the full header is well received.

The Ethernet header compression method described above may not be applied to SDAP control data (SDAP control PDU) and SDAP header of a higher layer device. Therefore, in network implementation, uncompressed SDAP control data or QoS information of the SDAP header may be read and transmission resources may be quickly scheduled. Further, in terminal implementation, since QoS information may be read from SDAP control data or SDAP header before decompression occurs at the reception end, implementation may be simplified, and since the transmission end may perform generation of SDAP control data or SDAP header in parallel with the header, data compression processing procedure, or ciphering procedure of the PDCP layer device, data processing time may be reduced. In addition, the transmission PDCP layer device or the reception PDCP layer device may identify the 1-bit indicator of the SDAP header of data received from a higher layer device or a lower layer device so as to distinguish whether the data is SDAP control data (SDAP control PDU) or SDAP user data (SDAP data PDU) having an SDAP header, and may perform data processing as described above. As another method, the transmission PDCP layer device or the reception PDCP layer device may identify the size of data received from the higher layer device or the lower layer device (e.g., whether the data size exceeds 1 byte, and if the data size is 1 byte, it may be determined as SDAP control data, and if the data size exceeds 1 byte, it may be determined as SDAP user data) so as to distinguish whether the data SDAP control data (SDAP control PDU) or SDAP user data having an SDAP header (SDAP data PDU), and may perform data processing, as described above.

Disclosed herein, are methods enabling performing of a user data compression procedure, which is not sensitive to loss, with regard to a data service with assumption of data loss or when a UDC compression method or a user data compression procedure is applied in a PDCP layer device connected to or configured in an RLC UM mode.

A UDC compression method is disclosed in consideration of loss or a first method of performing user data compression, as follows.

In the first method, a new second timer value may be configured via an RRC message as described above and shown in FIG. 5, and the second timer may be configured or applied together when a data compression method (e.g., UDC) is configured in the bearer or PDCP layer device. The second timer value may be configured to be a value smaller than the first timer value, and may be triggered or started when a sequence number gap is generated when the reception PDCP layer device reorders the received data in ascending order based on the PDCP sequence numbers or the COUNT values. In addition, when the sequence number gap is filled, the second timer may be paused. If the second timer expires because the sequence number gap is not filled, the reception PDCP layer device may include, in the PDCP control data (PDCP control PDU), an indication to initialize a buffer for the data compression method or information indicating that a data decompression failure has occurred and transmit the same to the transmission PDCP layer device, and the reception PDCP layer device may immediately initialize a buffer for the data compression method, or may initialize the buffer for the data compression method upon reception, from the transmission PDCP layer device, an indication to initialize the buffer for the data compression method or an indication indicating that the buffer has been initialized. The second timer value may be configured in consideration of a retransmission time of the MAC layer device or the RLC layer device, or a time taken to identify successful delivery. In addition, when the second timer expires in the above, the reception PDCP layer device may discard data, which is received before receiving of an indication to initialize the buffer for the data compression method or an indication indicating that the buffer has been initialized from the transmission PDCP layer device, without performing a deciphering or user data decompression procedure.

A UDC compression method is disclosed in consideration of loss or a second method of performing user data compression, as follows.

In the second method, a new third timer value (a maximum number of data in another method) may be configured via an RRC message as described above and shown in FIG. 5, and the third timer may be configured or applied together when a data compression method (e.g., UDC) is configured in the bearer or PDCP layer device. The third timer value may be configured to be a value smaller than the first timer value, and the reception PDCP layer device may start a third timer when the third timer value is configured. The third timer may be used for the reception PDCP layer device to periodically transmit, to the transmission PDCP layer device, the PDCP control data (PDCP control PDU) including an indication to initialize a buffer for a data compression method. That is, every time the third timer expires (every time the number of data, which is compressed by another method or to which the UDC procedure is applied and delivered to the lower layer, reaches the maximum number of data), the reception PDCP layer device may transmit, to the transmission PDCP layer device, the PDCP control data (PDCP control PDU) including an indication to initialize the buffer for the data compression method. In addition, the reception PDCP layer device may resume the third timer after transmitting the PDCP control data, immediately after the timer expires, or when an indication indicating that the buffer for the data compression method has been initialized or an indication to initialize the buffer is received from the transmission PDCP layer device. As another method, the third timer may be applied to a transmission PDCP layer device, and the transmission PDCP layer device may start the third timer to periodically initialize a buffer for the data compression method. That is, every time the third timer expires, the transmission PDCP layer device may initialize the buffer for the data compression method, and configure and transmit a 1-bit indicator of the UDC header, to indicate, to the reception PDCP layer device, that the buffer has been initialized or indicate the reception PDCP layer device to initialize the buffer. In addition, the transmission PDCP layer device may resume the third timer after the buffer is initialized, immediately after the timer expires, or after configuring a 1-bit indicator in the UDC header and transmitting the same. The third timer value may be configured in consideration of the retransmission time of the MAC layer device or the RLC layer device or the time taken to identify successful delivery. In addition, when the third timer expires, before receiving, from the transmission PDCP layer device, an indication indicating that the buffer for the data compression method has been initialized or an indication to initialize the buffer, the received data may be discarded without performing of a deciphering or user data decompression procedure.

A UDC compression method is provided in consideration of loss or a third method of performing user data compression, as follows.

The third method includes configuration information for a predefined library or dictionary information, which is to be input and used in a buffer when the data compression method is performed, and information indicating whether to perform the data compression or decompression procedure while updating the buffer with a series of packets by inputting the library or dictionary information into the buffer and performing compression at the beginning of starting the data compression or decompression method, or indicating whether to perform the data compression or decompression procedure based on a fixed buffer value by inputting the predefined library or dictionary information to the buffer for data compression or decompression, no longer updating the buffer with a series of data, and maintaining the library or dictionary information as the fixed buffer value. Therefore, if the indicator to use the fixed buffer value is configured, as above, the transmission PDCP layer device may apply the user data compression procedure to data by using the fixed buffer value without continuously updating the buffer with data to which user data compression is applied, in contrast to the descriptions provided for FIG. 7 and FIG. 8, and the reception PDCP layer device may perform a user data decompression procedure by using the fixed buffer value in the same manner as the transmission PDCP layer device and applying the fixed buffer value to received data, without updating the buffer value every time the user data decompression procedure is performed on the received data.

A UDC compression method is provided in consideration of loss or a fourth method of performing user data compression, as follows.

The fourth method may include configuration information on an RLC layer device connected to a PDCP layer device to which the data compression method is applied, and the configuration information for the RLC layer device may include an indicator or information indicating whether to reorder data, which is received during the reception operation of the RLC layer device, based on the RLC sequence number (in-sequence delivery function configuration) so as to deliver the data to the PDCP layer device, or whether to deliver data which has not been divided or reassembled with respect to the received data, to the PDCP layer device regardless of the order of the RLC sequence number (out-of-sequence delivery function configuration). Therefore, if the RLC layer device is configured based on the in-sequence delivery function in the above, the reception PDCP layer device may trigger and configure PDCP control data indicating that a user data decompression error has occurred if a sequence number gap is generated when reordering received data in ascending order based on the PDCP sequence number or COUNT value, and may transmit the PDCP control data to the transmission PDCP layer device. That is, the reception PDCP layer device may transmit, to the transmission PDCP layer device, the PDCP control data (PDCP control PDU) including an indication to initialize a buffer for the data compression method or information indicating that a data decompression failure has occurred, and the reception PDCP layer device may immediately initialize a buffer for the data compression method, or may initialize the buffer for the data compression method upon receiving, from the transmission PDCP layer device, an indication indicating that the buffer for the data compression method has been initialized or an indication to initialize the buffer. In addition, if a gap in the PDCP sequence numbers or COUNT values is generated, the reception PDCP layer device may discard data, which is received before receiving an indication indicating that the buffer for the data compression method has been initialized or an indication to initialize the buffer from the transmission PDCP layer device, without performing a deciphering or user data decompression procedure.

Disclosed are terminal operations performed when a transmission end PDCP layer device drives a PDCP discard timer, and data, which has not been transmitted due to the expiration of a PDCP discard timer and to which a UDC procedure has been applied, is discarded, making reference to FIG. 10.

In FIG. 10, in step 1*j*-01 a terminal may drive a PDCP discard timer for each received data every time data is received from a higher layer device, in step 1*j*-10. If the PDCP layer device is configured to perform UDC on the data (PDCP SDU), UDC is performed on the received data. The terminal performs UDC and updates a buffer according to the data compression, the terminal configures a UDC buffer. If the terminal performs UDC as above, a PDCP SDU received from a higher layer may be compressed into UDC compression data (UDC block) having a smaller size, in step 1*j*-15. In addition, a UDC header for the compressed UDC compression data is configured. The UDC header may include an indicator indicating whether UDC has been performed or not (e.g., if a 1-bit indicator of the UDC header is 0, this indicates that UDC has been applied, and if the indicator is 1, this indicates that no UDC has been applied).

If the terminal performs UDC on data (PDCP SDU) received from a higher layer and updates a UDC buffer, the terminal may calculate checksum bits and add the same to the UDC buffer in order for a reception end PDCP layer device to identify the validity of the updated UDC buffer (the checksum bits have a predetermined length, and may be configured by 4 bits, for example).

If integrity protection has been configured for data to which uplink data decompression is applied or for which uplink data decompression is not applied in the above, the terminal performs integrity protection, performs ciphering of the data, and delivers the ciphered data to a lower layer, in step 1*j*-20.

If the transmission PDCP layer device discards, in step 1*j*-30, data which has not yet been transmitted due to the expiration of the PDCP discard timer and for which UDC compression has been performed, the terminal may transmit data corresponding to the next PDCP sequence number of the discarded data, may discard all the remaining data (stored data which has a PDCP sequence number greater than a subsequent PDCP sequence number of the discarded data and has not yet been transmitted, and to which user data compression has been applied), and may transmit an indicator to discard the data to a lower layer device if the data has already been delivered to the lower layer device. The terminal may pause data transmission to the transmission PDCP layer device until a PDCP control PDU indicating that a checksum failure has occurred is received. Because intermediate or partial data of the UDC-compressed data is discarded, user data compression has been performed in advance, and with respect to data (e.g., PDCP PDU) having a higher PDCP sequence number than the discarded data, a checksum failure is to occur in the reception PDCP layer device. Therefore, when data corresponding to the subsequent PDCP sequence number of the discarded data is transmitted, the reception PDCP layer device is to identify the checksum failure and transmit the PDCP control PDU.

Therefore, when the transmission PDCP layer device receives the PDCP control PDU indicating that a checksum failure has occurred or before receiving the PDCP control PDU, the transmission PDCP layer device may initialize a transmission buffer for user data compression (if the transmission UDC buffer has already been initialized above, initialization is not performed), may perform the user data compression procedure again starting from data for which the PDCP discard timer has not yet expired and which has not yet been transmitted, or from the last transmitted data for which the PDCP discard timer has not yet expired (data corresponding to the subsequent PDCP sequence number of discarded data so as to be transmitted), and may cipher, generate, and prepare data (e.g., PDCP PDU) by assigning in ascending order starting from a new PDCP sequence number or a first PDCP sequence number that has not yet been transmitted. The transmission PDCP layer device may resume transmission of the newly generated and prepared data after receiving the PDCP control PDU indicating that the checksum failure has occurred. That is, data may be delivered to a lower layer device.

Figure 13:
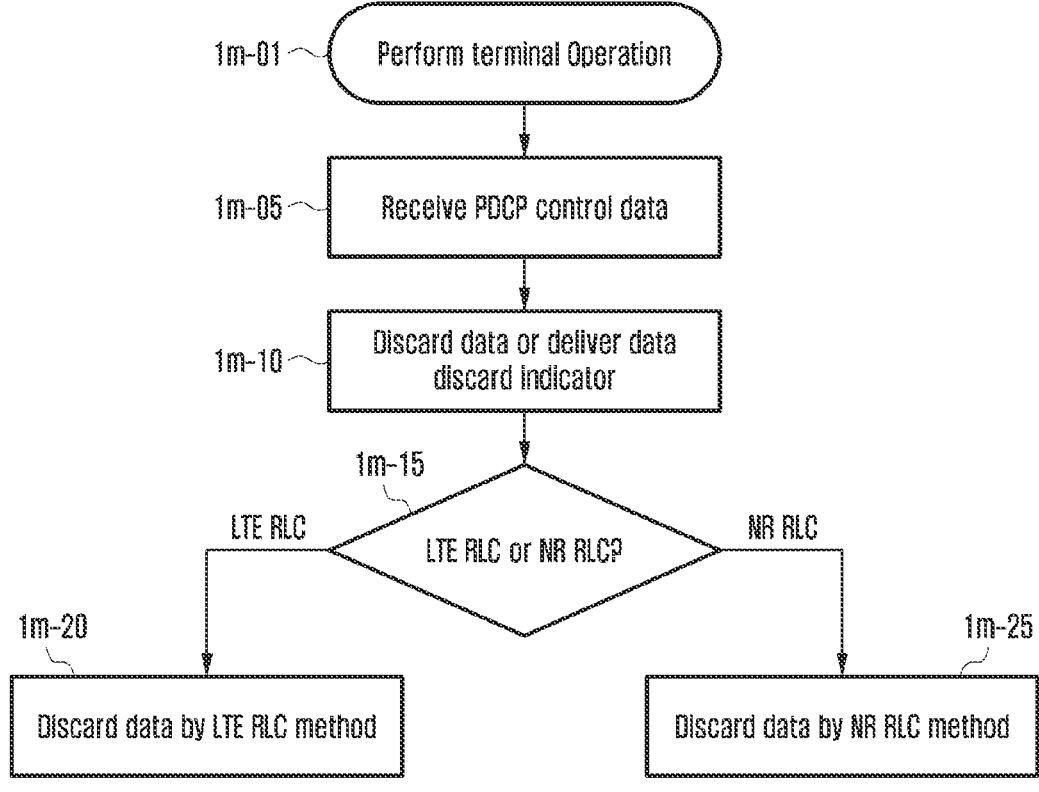
FIG. 13 illustrates operations of a terminal according to an embodiment.

FIG. 13 illustrates operation of a terminal according to an embodiment.

In step 1*m*-01 a UDC compression or decompression procedure is configured in a transmission end PDCP layer device of a terminal. The transmission end PDCP layer device receives, in step 1*m*-05, PDCP control data (PDCP control PDU) indicating that a checksum failure has occurred from the reception end PDCP layer device. Thus, the transmission end PDCP layer device may initialize a transmission UDC buffer for UDC. Alternatively, if the UDC compression or decompression procedure is configured in the PDCP layer device and the transmission end PDCP layer device receives, from the reception end PDCP layer device, PDCP control data (PDCP control PDU) indicating that a checksum failure has occurred, a data discard procedure may be performed by applying the first method or the second method disclosed herein to data which has been pre-generated, stored, or pre-processed, or for which a PDCP discard timer has not yet expired, in step 1*m*-10. In step 1*m*-15 a determination is made if the data discard indicator is received by an LTE RLC layer device or an NR RLC device. If an RLC layer device which has received the data discard indicator is an LTE RLC layer device, a data discard method of the LTE RLC layer device is performed in step 1*m*-20. If the RLC layer device which has received the data discard indicator is an NR RLC layer device, a data discard method of the NR RLC layer device is performed in step 1*m*-25.

Figure 14:
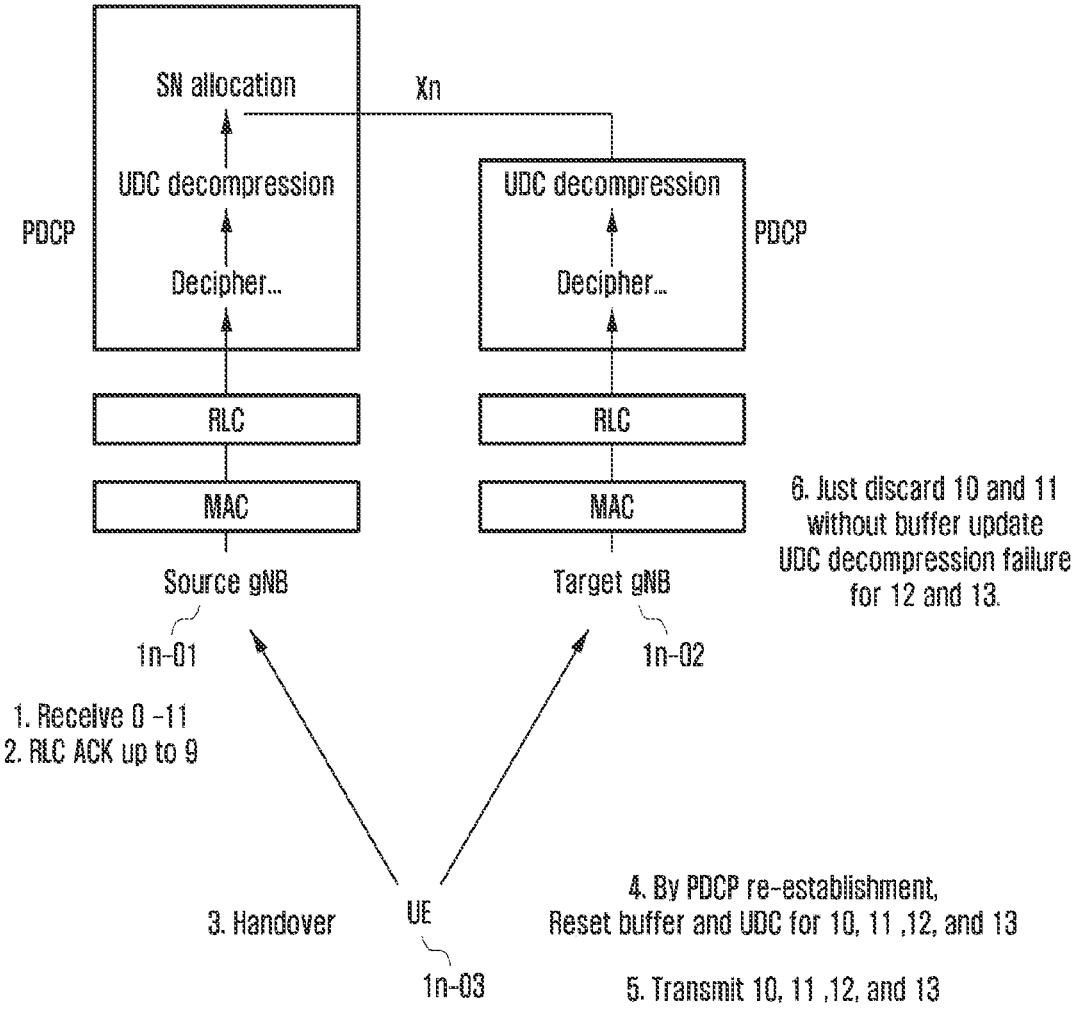
FIG. 14 illustrates a UDC decompression failure problem occurring during a handover procedure.

FIG. 14 illustrates a UDC decompression failure problem occurring during a handover procedure.

In FIG. 14, a terminal may receive service support while performing data transmission or reception in an RRC connected mode in a cell serviced by a source base station 1*n*-01. The terminal (UE 1*n*-03) is configured with a UDC compression method and, when transmitting uplink data, the terminal may transmit data compressed by applying a UDC compression procedure as disclosed herein. In FIG. 14, the terminal may compress data corresponding to PDCP sequence numbers 0, 1, 2, 3, 4, 5, 6, 7, 8, 9, 10, and 11 by applying the UDC compression method, so as to transmit the data via an uplink. In step 1 of FIG. 14, the source base station notifies the terminal that all of the uplink data (data corresponding to PDCP sequence numbers 0 to 11) transmitted by the terminal has been successfully received, and, in step 2, notifies the terminal, via an RLC state report, that the data corresponding to PDCP sequence number 9 has been successfully received. In step 3, the source base station indicates handover to a target base station (target gNB) 1*n*-02, to the terminal via an RRCReconfiguration message. Then, in step 4, when the terminal performs a handover procedure to the target base station. 1*n*-02, and a PDCP re-establishment procedure is indicated via the RRC message, the terminal may initialize a UDC compression buffer (a buffer value may be initialized to 0 or, if dictionary information is configured, the buffer value may be initialized to a dictionary value (dictionary or pre-dictionary)) while performing the PDCP re-establishment procedure, and may perform new UDC compression by applying the UDC compression method in ascending order of COUNT values (or PDCP sequence numbers) with respect to data 10, 11, 12, and 13 starting from data 10 that is first data for which a successful delivery has not been identified. In step 5, data 10, 11, 12, and 13 newly UDC-compressed based on the initialized compression buffer may be transmitted. When the UDC compression procedure is applied based on the initialized compression buffer, the compression procedure is performed sequentially so that data 10 is compressed based on the initialized compression buffer, data 11 is compressed based on data 10, data 12 is compressed based on data 11, and data 13 is compressed based on data 12. Therefore, if even one piece of data is lost, a UDC decompression failure occurs in data having a PDCP sequence number (or COUNT value) greater than that of the lost data.

Although the target base station has successfully received all the data transmitted by the terminal, data corresponding to data 10 and 11 has already successfully received in advance (because the source base station has already received the same successfully) so that the target base station may detect data 10 and 11 as redundantly received data so as to discard the same immediately via a data duplicate detection procedure. Accordingly, in step 6 of FIG. 14, the UDC decompression procedure may be applied to data 12 and data 13, in which case, since data 10 and data 11 have been discarded, decompression of data 12 and 13 compressed based on data 10 and 11 fails.

As described above, when the UDC compression method is applied during handover, a UDC decompression failure problem occurs in the reception end (a network, a base station, or a terminal). Therefore, methods are provided for solving the decompression failure problem, as follows. The following methods may be applied individually or may be applied in combination with each other:

First method: If duplicate packets are received, the reception end (e.g., the target base station) may decompress the duplicate packets before discarding the same, or may update the UDC buffer (e.g., a decompression buffer) with the duplicate packets and perform discard so as to prevent a decompression failure problem from occurring for packets received thereafter. The reception end (e.g., the target base station) may not transmit a PDCP state report to the transmission end (e.g., the terminal). This is because, if data, which is obtained by new UDC compression so as to be newly transmitted by the transmission end via the PDCP re-establishment procedure, is discarded due to reception of the PDCP state report, a UDC decompression failure problem may occur in the reception end.

Second method: The reception end (e.g., the source base station) may transmit a PDCP state report before or when indicating handover to the transmission end (e.g., the terminal) via the RRC message. If the reception end (e.g., the source base station) transmits the PDCP state report to the transmission end, duplicate packets are not generated because all the successfully delivered data is discarded based on the PDCP state report. That is, since all the data for which the new UDC compression procedure has been performed via the PDCP re-establishment procedure, is not duplicate data, but is newly transmitted data, a UDC decompression failure problem does not occur in the reception end (e.g., the target base station).

Third method: If handover is indicated (e.g., a reconfigurationWithSync indicator is included) or the PDCP re-establishment procedure is indicated in the RRC message, the transmission end (e.g., the terminal) may initialize the UDC compression buffer and not perform compression on data corresponding to a predetermined number when applying the UDC compression procedure to the data, or the transmission end may configure data by configuring an FU bit of the UDC header to 0 so as to indicate that the UDC compression has not been applied, thereby transmitting the data. In the above, the predetermined number may be configured via the RRC message, or any random number may be configured via terminal implementation.

As another method, the predetermined number may refer to the number of data until the PDCP state report is received from the reception end (e.g., the target base station). For example, if handover is indicated (e.g., a reconfiguration-WithSync indicator is included) or the PDCP re-establishment procedure is indicated in the RRC message, the transmission end (e.g., the terminal) may initialize the UDC compression buffer and may not perform compression for data until the PDCP state report is received from the reception end (e.g., the target base station) when applying the UDC compression procedure to the data, or may configure the data by configuring the FU bit of the UDC header to 0 so as to indicate that the UDC compression has not been applied, thereby transmitting the data. When the PDCP state report is received, the transmission end (e.g., the terminal) may apply the compression procedure based on the initialized UDC compression buffer, or may configure the data by configuring the FU bit of the UDC header to 1 so as to transmit the data.

Fourth method: If handover is indicated (e.g., a reconfigurationWithSync indicator is included) or the PDCP re-establishment procedure is indicated in the RRC message, the transmission end (e.g., the terminal) may initialize the UDC compression buffer, may perform compression continuously based on the initialized buffer with respect to data corresponding to a preconfigured number when applying the UDC compression procedure to the data, or may configure the data by configuring an FR bit of the UDC header to 1 so as to continuously indicate to initialize the UDC buffer, thereby transmitting the data. In the above, the predetermined number may be configured via the RRC message, or any random number may be configured via terminal implementation.

As another method, the predetermined number may refer to the number of data until the PDCP state report is received from the reception end (e.g., the target base station). For example, if handover is indicated (e.g., a reconfiguration-WithSync indicator is included) or the PDCP re-establishment procedure is indicated in the RRC message, the transmission end (e.g., the terminal) may initialize the UDC compression buffer and may perform compression continuously for data until the PDCP state report is received from the reception end (e.g., the target base station) when applying the UDC compression procedure to the data, or may configure the data by configuring the FR bit of the UDC header to 1 so as to continuously indicate to initialize the UDC buffer, thereby transmitting the data. When the PDCP state report is received, the transmission end (e.g., the terminal) may apply the compression procedure based on the initialized UDC compression buffer, or may configure the data by configuring the FR bit to 0 so as to transmit the data.

Fifth method: The transmission end (e.g., the terminal) may initialize the UDC compression buffer every time the PDCP state report (or an identifier via the RRC message or PDCP control data) is received from the reception end (the source base station or the target base station), and may configure the FR bit of the UDC header to 1 with respect to first data to be transmitted after the initialization, so as to indicate initialization of the UDC buffer. Due to the above procedure, the reception end can prevent a decompression failure problem in advance by transmitting the PDCP state report (or an indicator via the RRC message or PDCP control data).

The UDC decompression failure problem described in FIG. 14 may also occur even when packets are received out-of-order, in addition to the case of duplicate packets, during the handover procedure. Therefore, when the reception end is to apply the UDC decompression procedure to the received data (or when the PDCP reordering timer has expired and the reception end is to apply the UDC decompression procedure), if the data is out of order, or if there is a loss between PDCP sequence numbers (or COUNT values) of the data or there is a loss for data corresponding to a PDCP sequence number (or COUNT value) smaller than that of the data, a UDC decompression failure may be expected, so that the reception end may discard the data without performing the UDC compression procedure for the data.

Therefore, efficient transmission of an end PDCP layer is provided for device operations or reception end PDCP layer device operations to prevent unnecessary data transmission with respect to a checksum failure which may occur during the user data compression or decompression procedure.

The disclosure provides efficient transmission end PDCP layer device operations or reception end PDCP layer device operations for preventing unnecessary data transmission with respect to a checksum failure which may occur during the user data compression or decompression procedure, thereby reducing unnecessary transmission resource waste and unnecessary data processing. The disclosed methods of configuring user data compression for a terminal can be performed by a base station.

Figure 15:
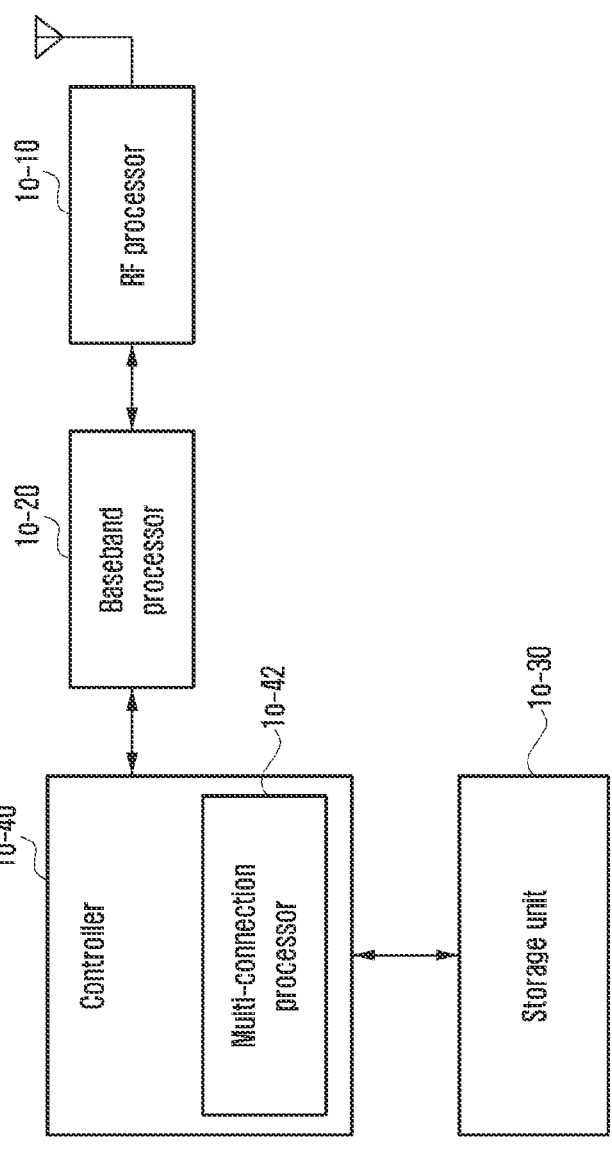
FIG. 15 illustrates a terminal according to an embodiment.

FIG. 15 illustrates a terminal according to an embodiment.

Referring to FIG. 15, a terminal includes a radio frequency (RF) processor 1o-10, a baseband processor 1o-20, a storage unit 1o-30, and a controller 1o-40.

The RF processor 1o-10 performs a function for transmitting or receiving a signal via a radio channel, such as band conversion and amplification of the signal. That is, the RF processor 1o-10 up-converts a baseband signal provided from the baseband processor 1o-20 into an RF band signal, transmits the converted RF band signal via the antenna, and then down-converts the RF band signal received via the antenna into a baseband signal. For example, the RF processor 1o-10 may include a transmission filter, a reception filter, an amplifier, a mixer, an oscillator, a digital-to-analog converter (DAC), an analog-to-digital converter (ADC), and the like. Although only one antenna is illustrated, the terminal may have multiple antennas. The RF processor 1o-10 may include multiple RF chains. The RF processor 1o-10 may perform beamforming. For beamforming, the RF processor 1o-10 may adjust a phase and a magnitude of each of signals transmitted or received via the plurality of antennas or antenna elements. The RF processor may perform MIMO, and may receive multiple layers when performing MIMO operations. The RF processor 1o-10 may perform reception beam sweeping by appropriately configuring the plurality of antennas or antenna elements under the control of the control unit, or may adjust the direction and beam width of the reception beam so that the reception beam is coordinated with a transmission beam.

The baseband processor 1o-20 performs conversion between a baseband signal and a bitstream according to a physical layer specification of a system. For example, during data transmission, the baseband processor 1o-20 generates complex symbols by encoding and modulating a transmission bitstream. When data is received, the baseband processor 1o-20 reconstructs a reception bitstream via demodulation and decoding of the baseband signal provided from the RF processor 1o-10. For example, in a case of conforming to an OFDM scheme, during data transmission, the baseband processor 1o-20 generates complex symbols by encoding and modulating a transmission bitstream, maps the complex symbols to sub-carriers, and then configures OFDM symbols by performing an inverse fast Fourier transform (IFFT) operation and cyclic prefix insertion. Further, during data reception, the baseband processor 1o-20 divides the baseband signal provided from the RF processor 1o-10 in units of OFDM symbols, reconstructs the signals mapped to the sub-carriers via a fast Fourier transform (FFT) operation, and then reconstructs the reception bitstream via demodulation and decoding.

The baseband processor 1o-20 and the RF processor 1o-10 transmit and receive signals as described above. Accordingly, the baseband processor 1o-20 and the RF processor 1o-10 may be referred to as a transmitter, a receiver, a transceiver, or a communication unit. Moreover, at least one of the baseband processor 1o-20 and the RF processor 1o-10 may include a plurality of communication modules to support a plurality of different radio access technologies. At least one of the baseband processor 1o-20 and the RF processor 1o-10 may include different communication modules to process signals in different frequency bands. For example, the different radio access technologies may include an LTE network, an NR network, and the like. Further, the different frequency bands may include a super high frequency (SHF) (e.g., 2.5 GHz and 5 GHz) band and a millimeter wave (e.g., 60 GHz) band.

The storage unit 1o-30 stores data, such as a default program, an application program, and configuration information, for operation of the terminal. The storage unit 1o-30 provides stored data in response to a request of the controller 1o-40.

The controller 1o-40 controls overall operations of the terminal. For example, the controller 1o-40 transmits or receives a signal via the baseband processor 1o-20 and the RF processor 1o-10. The controller 1o-40 records and reads data in the storage unit 1o-30. To this end, the controller 1o-40 may include at least one processor 1o-42. For example, the controller 1o-40 may include a communication processor (CP) configured to perform control for communication and an application processor (AP) configured to control a higher layer, such as an application program.

Figure 16:
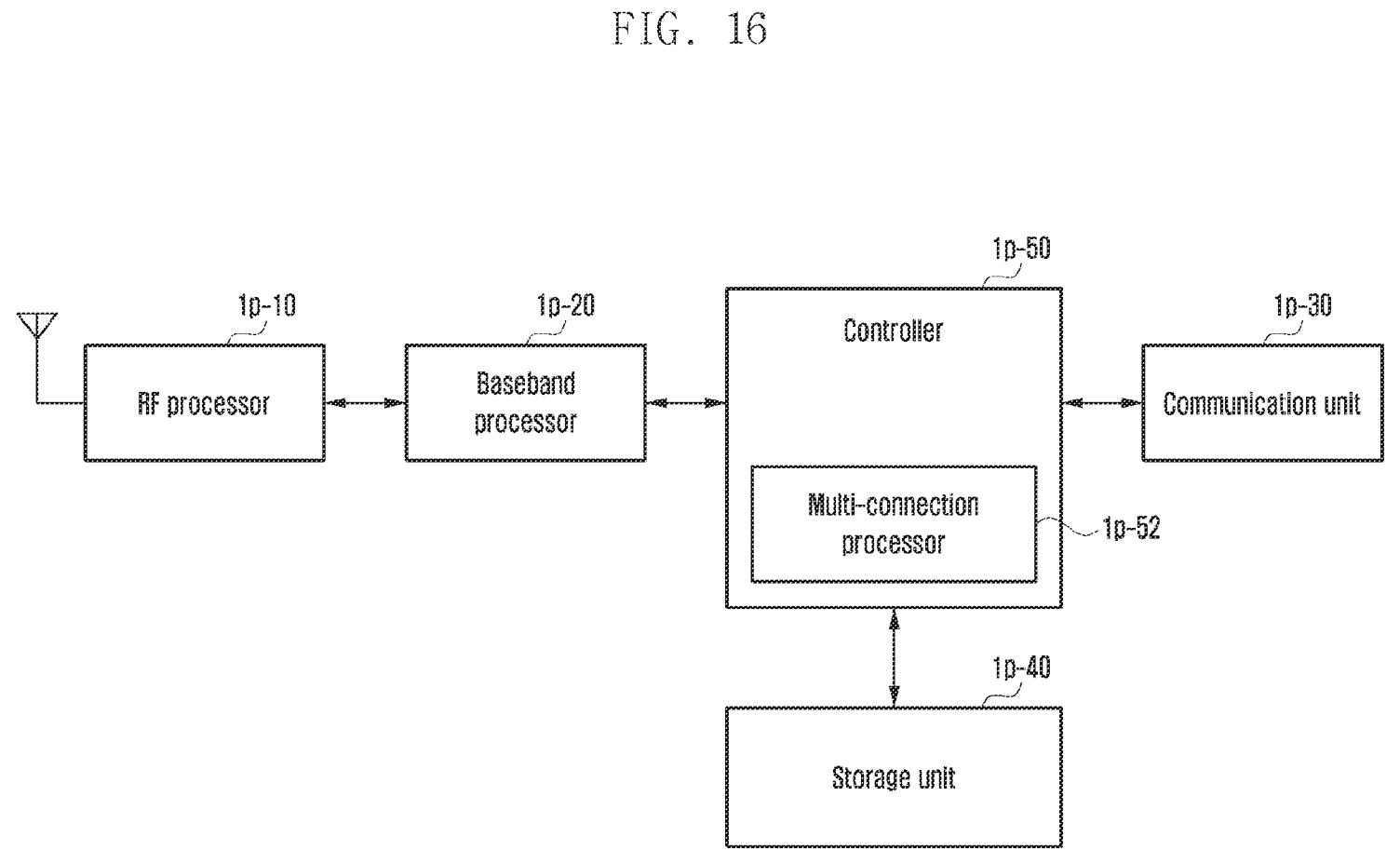

FIG. 16 illustrates a TRP in a wireless communication system according to an embodiment.

As illustrated in FIG. 16, a TRP (or a base station) includes an RF processor 1p-10, a baseband processor 1p-20, a backhaul communication unit 1p-30, a storage unit 1p-40, and a controller 1p-50.

The RF processor 1p-10 performs a function for transmitting or receiving a signal via a radio channel, such as band conversion and amplification of the signal. That is, the RF processor 1p-10 up-converts a baseband signal provided from the baseband processor 1p-20 into an RF band signal, transmits the converted RF band signal via an antenna, and then down-converts the RF band signal received via the antenna into a baseband signal. For example, the RF processor 1p-10 may include a transmission filter, a reception filter, an amplifier, a mixer, an oscillator, a DAC, an ADC, etc. Although only one antenna is illustrated, a first access node may include multiple antennas. The RF processor 1p-10 may include multiple RF chains. The RF processor 1p-10 may perform beamforming. For beamforming, the RF processor 1p-10 may adjust a phase and a magnitude of each of signals transmitted or received via the multiple antennas or antenna elements. The RF processor may perform downlink MIMO operations by transmitting one or more layers.

The baseband processor 1p-20 performs a function of conversion between a baseband signal and a bitstream according to a physical layer specification of a first radio access technology. For example, during data transmission, the baseband processor 1p-20 generates complex symbols by encoding and modulating a transmission bitstream. When data is received, the baseband processor 1p-20 reconstructs a reception bitstream via demodulation and decoding of the baseband signal provided from the RF processor 1p-10. For example, in a case of conforming to an OFDM scheme, during data transmission, the baseband processor 1p-20 generates complex symbols by encoding and modulating a transmission bitstream, maps the complex symbols to subcarriers, and then configures OFDM symbols by performing IFFT operation and CP insertion. Further, during data reception, the baseband processor 1p-20 divides the baseband signal provided from the RF processor 1p-10 in units of OFDM symbols, reconstructs the signals mapped to the sub-carriers via an FFT operation, and then reconstructs the reception bitstream via demodulation and decoding. The baseband processor 1p-20 and the RF processor 1p-10 transmit and receive signals as described above. Accordingly, the baseband processor 1p-20 and the RF processor 1p-10 may be referred to as a transmitter, a receiver, a transceiver, a communication unit, or a wireless communication unit.

The backhaul communication unit 1p-30 provides an interface configured to perform communication with other nodes within a network.

The storage unit 1p-40 stores data, such as a default program for operation of the main base station, an application program, and configuration information. Particularly, the storage unit 1p-40 may store information on a bearer assigned to a connected terminal, a measurement result reported from the connected terminal, and the like. The storage unit 1p-40 may store information serving as a criterion for determining whether to provide the terminal with multiple connections or to suspend the same. The storage unit 1p-40 provides stored data in response to a request of the controller 1p-50.

The controller 1p-50 controls overall operations of the base station. For example, the controller 1p-50 transmits or receives a signal via the baseband processor 1p-20 and the RF processor 1p-10 or via the backhaul communication unit 1p-30. The controller 1p-50 records and reads data in the storage unit 1p-40. To this end, the controller 1p-50 may include at least one processor 1p-52. In the above-described detailed embodiments, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:
   receiving, from a base station, a radio resource control (RRC) message including packet data convergence protocol (PDCP) configuration information;
   in case that an uplink data compression (UDC) configuration is included in the PDCP configuration information, generating uplink data using a UDC protocol based on the UDC configuration; and
   transmitting, to the base station, the uplink data,
   wherein a PDCP entity of the terminal is a new radio (NR) PDCP, and
   wherein, in case that the RRC message is an RRC reconfiguration message to perform reconfiguration with sync and a PDCP re-establishment is indicated by the RRC reconfiguration message, the method further comprises:
   identifying whether an indicator is configured based on the UDC configuration, wherein the indicator indicates whether the UDC configuration is continued;
   in case that the indicator is configured, continuing to use the UDC protocol during the PDCP re-establishment, and
   in case that the indicator is not configured, resetting a UDC buffer to zero and filling the UDC buffer based on a configured dictionary.

2. The method of claim 1,
   wherein the UDC configuration is included in the PDCP configuration information, in case that a radio link control (RLC) entity of a data radio bearer (DRB) associated with the NR PDCP is set to an acknowledged mode (AM) and an out-of-order delivery is not configured for the DRB.

3. The method of claim 1,
   wherein, in case that the DRB is configured as a split bearer, each RLC entity associated with the NR PDCP is set to the AM.

4. The method of claim 1,
   wherein the PDCP configuration information does not include an Ethernet header compression (EHC) configuration.

5. A method performed by a base station in a wireless communication system, the method comprising:
   transmitting, to a terminal, a radio resource control (RRC) message including packet data convergence protocol (PDCP) configuration information, the PDCP configuration information including an uplink data compression (UDC) configuration; and
   receiving, from the terminal, uplink data based on the UDC configuration,
   wherein a PDCP entity of the terminal is a new radio (NR) PDCP,
   wherein the RRC message is an RRC reconfiguration message to perform reconfiguration with sync and indicates a PDCP re-establishment,
   wherein, in case that an indicator is configured by the UDC configuration, a UDC protocol used for generating the uplink data is continued to be used during the PDCP re-establishment, the indicator indicating whether the UDC configuration is continued, and wherein, in case that the indicator is not configured by the UDC configuration, a UDC buffer is reset to zero and filled based on a configured dictionary.

6. The method of claim 5, wherein the UDC configuration is included in the PDCP configuration information, in case that a radio link control (RLC) entity of a data radio bearer (DRB) associated with the NR PDCP set to an acknowledged mode (AM) and an out-of-order delivery is not configured for the DRB.

7. The method of claim 6, wherein, in case that the DRB is configured as a split bearer, each RLC entity associated with the NR PDCP is set to the AM.

8. The method of claim 5, wherein the PDCP configuration information does not include an Ethernet header compression (EHC) configuration.

9. A terminal in a wireless communication system, the terminal comprising:

a transceiver; and a controller configured to:

control the transceiver to receive, from a base station, a radio resource control (RRC) message including packet data convergence protocol (PDCP) configuration information;

in case that an uplink data compression (UDC) configuration is included in the PDCP configuration information, generate uplink data using a UDC protocol based on the UDC configuration; and control the transceiver to transmit, to the base station, the uplink data, wherein a PDCP entity of the terminal is a new radio (NR) PDCP, and wherein, in case that the RRC message is an RRC reconfiguration message to perform reconfiguration with sync and a PDCP re-establishment is indicated by the RRC reconfiguration message, the controller is further configured to:

identify whether an indicator is configured based on the UDC configuration, wherein the indicator indicates whether the UDC configuration is continued;

in case that the indicator is configured, continue to use the UDC protocol during the PDCP re-establishment, and in case that the indicator is not configured, reset a UDC buffer to zero and fill the UDC buffer based on a configured dictionary.

10. The terminal of claim 9, wherein the UDC configuration is included in the PDCP configuration information, in case that a radio link control (RLC) entity of a data radio bearer (DRB) associated with the NR PDCP is set to an acknowledged mode (AM) and an out-of-order delivery is not configured for the DRB.

11. The terminal of claim 10, wherein, in case that the DRB is configured as a split bearer, each RLC entity associated with the NR PDCP is set to the AM.

12. The terminal of claim 9, wherein the PDCP configuration information does not include an Ethernet header compression (EHC) configuration.

13. A base station in a wireless communication system, the base station comprising:

a transceiver; and a controller configured to:

control the transceiver to transmit, to a terminal, a radio resource control (RRC) message including packet data convergence protocol (PDCP) configuration information, the PDCP configuration information including an uplink data compression (UDC) configuration, and control the transceiver to receive, from the terminal, uplink data based on the UDC configuration, wherein a PDCP entity of the terminal is a new radio (NR) PDCP, wherein the RRC message is an RRC reconfiguration message to perform reconfiguration with sync and indicates a PDCP re-establishment, wherein, in case that an indicator is configured by the UDC configuration, a UDC protocol used for generating the uplink data is continued to be used in the terminal during the PDCP re-establishment, the indicator indicating whether the UDC configuration is continued, and wherein, in case that the indicator is not configured by the UDC configuration, a UDC buffer is reset to zero and filled based on a configured dictionary.

14. The base station of claim 13, wherein the UDC configuration is included in the PDCP configuration, in case that a radio link control (RLC) entity of a data radio bearer (DRB) associated with the NR PDCP set to an acknowledged mode (AM) and an out-of-order delivery is not configured for the DRB.

15. The base station of claim 14, wherein, in case that the DRB is configured as a split bearer, each RLC entity associated with the NR PDCP is set to the AM.

16. The base station of claim 13, wherein the PDCP configuration information does not include an Ethernet header compression (EHC) configuration.

* * * * *